US012675722B2

(12) United States Patent
Miyazaki et al.

(10) Patent No.: US 12,675,722 B2
(45) Date of Patent: Jul. 7, 2026

(54) SUPERCONDUCTING QUANTUM CIRCUIT

(71) Applicant: NEC Corporation, Tokyo (JP)

(72) Inventors: Ryoji Miyazaki, Tokyo (JP); Tsuyoshi Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 30 days.

(21) Appl. No.: 18/872,941

(22) PCT Filed: Jun. 22, 2022

(86) PCT No.: PCT/JP2022/024825
§ 371 (c)(1),
(2) Date: Dec. 9, 2024

(87) PCT Pub. No.: WO2023/248370
PCT Pub. Date: Dec. 28, 2023

(65) Prior Publication Data
US 2025/0328799 A1 Oct. 23, 2025

(51) Int. Cl.
*G06N 10/40* (2022.01)

(52) U.S. Cl.
CPC .................................... *G06N 10/40* (2022.01)

(58) Field of Classification Search
None
See application file for complete search history.

(56) References Cited

U.S. PATENT DOCUMENTS 11,915,100 B2 * 2/2024 Yamaji ................. H03B 15/003
12,244,306 B2 * 3/2025 Yamaji ................... H10N 60/12
2017/0093381 A1 3/2017 Abdo
2017/0104695 A1 4/2017 Naaman
2018/0218279 A1 8/2018 Lechner et al.
(Continued)

FOREIGN PATENT DOCUMENTS

JP 2021-108308 A 7/2021
JP 2021-516389 A 7/2021
(Continued)

OTHER PUBLICATIONS

Extended European Search Report for EP Application No. 22947932.4, dated on Jul. 21, 2025.
(Continued)

*Primary Examiner* — Cassandra F Cox
(74) *Attorney, Agent, or Firm* — Sughrue Mion, PLLC

(57) ABSTRACT

A superconducting quantum circuit includes first to fourth qubits and a coupler including a loop circuit connected between one end and other end of the coupler and a capacitor connected in parallel to the loop circuit, wherein the loop circuit includes n (n>=2) first Josephson junctions arranged in series and a second Josephson junction arranged in parallel with the n first Josephson junctions with a junction size smaller than that of the first Josephson junction, the first and second qubits capacitively coupled to the one end of the coupler, the third and fourth qubits capacitively coupled to the other end of the coupler, a magnitude of a coupling coefficient of the four-body interaction by the coupler being configurable based on circuit parameters including at least the n and α (0<α<1) which is a ratio of a Josephson energy between the second Josephson junction and the first Josephson junction.

12 Claims, 12 Drawing Sheets

(56) References Cited

U.S. PATENT DOCUMENTS

| | | | | |
|---|---|---|---|---|
| 2018/0341874 | A1 | 11/2018 | Puri et al. | |
| 2019/0104614 | A1 | 4/2019 | Abdo et al. | |
| 2019/0294991 | A1 | 9/2019 | Filipp et al. | |
| 2021/0201188 | A1 | 7/2021 | Yamaji et al. | |
| 2021/0272008 | A1 | 9/2021 | Oliver et al. | |
| 2021/0326737 | A1* | 10/2021 | Jin | H10N 60/12 |
| 2022/0247407 | A1 | 8/2022 | Yamamoto et al. | |
| 2022/0261676 | A1 | 8/2022 | Yamamoto et al. | |
| 2022/0261680 | A1 | 8/2022 | Hasegawa et al. | |
| 2022/0318660 | A1* | 10/2022 | Hasegawa | H10N 69/00 |
| 2023/0163762 | A1 | 5/2023 | Yamaji et al. | |
| 2023/0318601 | A1* | 10/2023 | Yamaji | G06N 10/20 |
| 2025/0301922 | A1* | 9/2025 | Miyazaki | H03K 17/92 |

FOREIGN PATENT DOCUMENTS

| | | | |
|---|---|---|---|
| JP | 2023-076272 | A | 6/2023 |
| WO | 2017/001404 | A1 | 1/2017 |
| WO | 2017/055988 | A1 | 4/2017 |
| WO | 2017/062143 | A1 | 4/2017 |
| WO | 2019/063113 | A1 | 4/2019 |
| WO | 2021/014885 | A1 | 1/2021 |
| WO | 2021/014888 | A1 | 1/2021 |
| WO | 2021/014889 | A1 | 1/2021 |
| WO | 2021/014891 | A1 | 1/2021 |
| WO | 2021/195368 | A1 | 9/2021 |

OTHER PUBLICATIONS

International Search Report for PCT Application No. PCT/JP2022/024825, mailed on Sep. 20, 2022.

Shruti Puri, et. al, "Quantum annealing with all-to-all connected nonlinear oscillators", Nature Communications 8, 15785 (2017).

Yufeng Ye, et. al, "Engineering Purely Nonlinear Coupling between Superconducting Qubits Using a Quarton", Physical Review Letters 127, 050502 (2021).

Uri Vool, et. al, "Introduction to Quantum Electromagnetic Circuits", International Journal of Circuit Theory and Applications 45, 897 ( 2016).

T Yamashita, et. al, "Superconducting r qubits with three Josephson junctions", Appl. Phys. Lett. 88, 132501 (2006).

V. V. Ryazanov, et.al, "Coupling of Two Superconductors through a Ferromagnet: Evidence for a π Junction", Phys. Rev. Lett. 86, 2427—Published Mar. 12, 2001.

* cited by examiner

SUPERCONDUCTING QUANTUM CIRCUIT

This application is a National Stage Entry of PCT/JP2022/024825 filed on Jun. 22, 2022, the contents of all of which are incorporated herein by reference, in their entirety.

FIELD

The present disclosure relates to a superconducting quantum circuit.

BACKGROUND

As a method for solving a combinatorial optimization problem, there is a quantum annealing. As one of schemes of the quantum annealing, there is one called LHZ (Lechner, Hauke, Zoller) scheme (see, e.g., Patent Literature (PTL) 1). In order to physically implement an LHZ scheme-based quantum annealing, it is necessary to realize a qubit (quantum bit) which is a basic element, and a network of qubits, especially a network in which four qubits interact with each other simultaneously (four-body interaction). As one of implementation modes, a method (technique) using a Josephson Parametric Oscillator (JPO) as a qubit has been proposed (see, e.g., Non-Patent Literature (NPL) 1).

(a) One of the methods can realize a four-body interaction with a simple structure, as illustrated in FIG. 1. FIG. 1 is based on Figure a in FIG. 4 of NPL 1. FIG. 1 illustrates a system in which JPO1 to JPO4 with resonant angular frequencies $\omega_{r,i}$ (i=1,2,3,4) interact through a single Josephson junction (JJ) (JPO1 to JPO4 with different resonant angular frequencies are illustrated with different patterns according to FIG. 4 of NPL 1).

A SQUID (Superconducting Quantum Interference Device) loop of each JPO is driven by a flux pump whose amplitude and frequency are tunable. An angular frequency $\omega_{p,k}(t)$ (k=1,2,3,4) of the pump signal, is set to nearly twice an angular frequency of a resonator: $2\omega_{r,i}$. In a Josephson Parametric Amplifier (JPA), there is a certain threshold for a strength of a pump. When the strength of the pump exceeds the threshold, JPA begins to oscillate and output a signal with a resonant angular frequency $\omega_{r,i}$ even when no input signal is present. This is called a parametric oscillation. The present specification is directed to a resonator that parametrically oscillates and thus JPA in FIG. 4 of NPL 1 is denoted here as JPO.

A local four-body coupling is realized by a nonlinear inductance of a central Josephson junction JJ (coupler).

As angular frequencies of the pump signals for JPO1 to JPO4, selection thereof is done as follows to detune the resonators.

$$\omega_{p,1}(t)+\omega_{p,2}(t)=\omega_{p,3}(t)+\omega_{p,4}(t) \tag{1.1}$$

Assuming that the pump signals for JPO1 to JPO4 are detuned from each other, the central Josephson junction JJ (coupler), in a rotational coordinate system of a two-photon drive (two-photon drive), causes a coupling with the following form.

$$-G\left(\hat{a}_1^\dagger\hat{a}_2^\dagger\hat{a}_3^\dagger\hat{a}_4+\hat{a}_4^\dagger\hat{a}_3\hat{a}_2\hat{a}_1\right) \tag{1.2}$$

This four-body interaction is always active and its strength G depends on a nonlinearity of the central Josephson junction JJ and a detuning of the resonators including JPO and the Josephson junction JJ. It is noted that ai (i=1 to 4) is an annihilation operator of a resonance mode (boson) of JPOs 1 to 4, and $a_i^+$ (i=1 to 4) is a creation operator. G in Equation (1.2) is given by $$G=E_J\frac{\phi_c^4}{\phi_0^4}\frac{g_1g_2g_2g_4}{\Delta_1\Delta_2\Delta_2\Delta_4} \tag{1.3}$$

In Equation (1.3), $\Delta_k$ (k=1,2,3,4) is a difference (detuning) between a mode angular frequency $\omega_{r,k}$ of k-th JPO and a mode angular frequency (resonant angular frequency) $\omega_c$ defined by a capacitance and an inductance of the central Josephson junction JJ (coupler).

$$\Delta_k=\omega_c-\omega_{r,k}\ (k=1,2,3,4) \tag{1.4}$$

$\phi_0$ is a magnetic flux quantum (reduced magnetic quantum flux):

$$\phi_0=\frac{\hbar}{2e} \tag{1.5}$$

where $\hbar$ is a Dirac constant $$\hbar=\frac{h}{2\pi} \tag{1.6}$$

(h is a Planck's constant, e is an elementary charge)

In Equation (1.3), $\phi_c$ is a standard deviation of a zero-point flux variation of the JJ mode.

$E_J$ is a Josephson energy of the central Josephson junction JJ and is proportional to a critical current $I_c$ of the Josephson junction.

$$E_J=\frac{\hbar}{2e}I_c \tag{1.7}$$

$g_k$ (k=1,2,3,4) expresses a magnitude of coupling of a k-th JPO with a mode of the central Josephson junction JJ.

$$g_k=\frac{\phi_0^2e^2}{2C\phi_c\phi_k} \tag{1.8}$$

In Equation (1.8), $\phi_k$ (k=1,2,3,4) is a zero-point flux variation of the JPO mode, C is a capacitance value of a coupling capacitor between the coupler and the qubit.

It is noted that in NPL 1, C is used as a four-body coupling strength in Equations (1.2) and (1.3), but G is used here to distinguish the coupling strength from the coupling capacitor C or the like. In NPL 1, a method of strengthening a four-body interaction is not clear with respect to the configuration of FIG. 1.

(b) The other method uses a Josephson Ring Modulator (JRM), as illustrated in FIG. 2. FIG. 2 is based on Supplementary FIG. 8 of NPL 1. It is noted that in FIG. 2, JPA in Supplementary FIG. 8 of Supplementary Note 8 of NPL 1 is denoted as JPO. Microwave drive signals with an equal signal strength and reverse phases (indicated by solid and dashed arrow lines for capacitors Cx and Cy) activate a four-body coupling between the JPOs.

In the example in FIG. 2, a tunable four-body interaction is realized by using an unbalanced shunt-type JRM. JRM includes two pairs of Josephson junctions (JJs) connected in parallel, each pair being connected in series between a first node which is a connection point of JPO1 and JPO2, and a second node which is a connection point of JPO3 and JPO4. A microwave drive signal is applied to each of the first and second nodes via a capacitor Cx, respectively. A microwave drive signal with a phase reversed to that of the microwave drive signal applied to the capacitor Cx is applied via a capacitor Cy to each connection point of Josephson junctions (JJ) of the two pair connected in parallel.

In this case, in order to implement a four-body interaction, when a combination of oscillation angular frequencies to be met by JPO1 to JPO4 and an angular frequency $\omega_d$ of the drive signal input from capacitors Cx and Cy is, for example, as follows, $$\omega_d = \omega_{p,1} + \omega_{p,2} + \omega_{p,3} - \omega_{p,4} \tag{1.9}$$

for the following drive signal, $$2\Phi_z(\sqrt{n})\cos(\omega_d t) \tag{1.10}$$

(where n is the number of photons (photons) in mode z) under a rotating wave approximation, the following Hamiltonian is derived.

$$H_{plaquette} \cong \sum_{k=1}^{4}\left[H_{jpo,k} - \frac{(g_k^x)^2}{\Delta_k^x}\hat{a}_k^\dagger\hat{a}_k\right] - C_{jrm}\left(\hat{a}_1^\dagger\hat{a}_2^\dagger\hat{a}_3^\dagger\hat{a}_4 + \hat{a}_4^\dagger\hat{a}_3\hat{a}_2\hat{a}_1\right) \tag{1.11}$$

$$\text{where } C_{jrm} = E_J\sqrt{n}\,\frac{\phi_x^4\phi_z}{4\phi_0^5}\,\frac{g_1g_2g_2g_4}{\Delta_1\Delta_2\Delta_2\Delta_4} \tag{1.12}$$

The second term on the right side of Equation (1.11) is a term of the four-body interaction. Equation (1.12) is a coupling coefficient for a strength of the coupling of the four-body interaction, where $\sqrt{n}$ is proportional to a strength of the microwave drive.

As a configuration of a related art similar to FIG. 1, a circuit using a lumped constant type JPO is disclosed in, for example, PTL 2, as illustrated in FIG. 3.

Referring to FIG. 3, four JPO1(120A) to JPO4(120D) and a coupler 121 are provided. Coupler connection portions 124A to 124D of JPO1(120A) to JPO4(120D) and the coupler 121 composed of a Josephson junction (JJ) are capacitively coupled via capacitors (coupling capacitors) 131A to 131D, respectively. Readout circuit connection portions 122A to 122D of JPO1 (120A) to JPO4 (120D) are capacitively coupled to readout circuits 140A to 140D via capacitors 132A-132D, respectively. JPO1 (120A) to JPO4 (120D) are connected respectively via control lines 123A to 123D to signal generators 150A to 150D that generate pump signals to generate magnetic fluxes that penetrate SQUID loops of JPO1 (120A) to JPO4 (120D). A nonlinear element 110 of the coupler 121 is an element that can be regarded as an LC resonator with a Josephson junction (JJ) as a nonlinear inductance. The nonlinear element 110 may be a SQUID including two Josephson junctions (JJ).

A coupler including a circuit similar to a loop circuit of (B) of FIG. 5 described below, is disclosed in NPL 2. However, NPL 2 does not disclose a coupler for a four-body interaction of four qubits. Differences between the present disclosure and that of NPL 2 will be detailed in the example embodiments.

[PTL 1]International Publication No. 2017/001404

[PTL 2] International Publication No. 2021/014885

[NPL 1] Shruti Puri, et. al, "Quantum annealing with all-to-all connected nonlinear oscillators", Nature Communications 8, 15785 (2017)

[NPL 2] Yufeng Ye, et. al, "Engineering Purely Nonlinear Coupling between Superconducting Qubits Using a Quarton", PHYSICAL REVIEW LETTERS 127, 050502 (2021)

[NPL 3] Uri Vool, et. al, "Introduction to Quantum Electromagnetic Circuits", International Journal of Circuit Theory and Applications 45, 897 (2016)

[NPL 4] T Yamashita, et. al, "Superconducting π qubits with three Josephson junctions", Appl. Phys. Lett. 88, 132501 (2006)

[NPL 5] V. V. Ryazanov, et. al, "Coupling of Two Superconductors through a Ferromagnet: Evidence for a 90 Junction", Phys. Rev. Lett. 86, 2427—Published 12 Mar. 2001

SUMMARY

In NPL 1 and PTL 2 illustrated in FIG. 1 to FIG. 3, there is no mention on a method (technique) for strengthening a four-body interaction. The configuration in FIG. 2 allows a strength of the four-body interaction to be adjusted but requires another external input(s) (microwave drive signals input with reverse phases to the capacitors Cx and Cy).

The present disclosure is originated in view of the above issues, and a purpose thereof is to provide a superconducting quantum circuit with a coupler configured to enable to strengthen a four-body interaction by circuit parameters.

According to an aspect of the present disclosure, a superconducting quantum circuit includes: first to fourth qubits; and a coupler that couples the first to fourth qubits by a four-body interaction. The coupler includes: a loop circuit connected between one end and an other end of the coupler; and a capacitor connected in parallel to the loop circuit, wherein the loop circuit includes: n (n is a positive integer greater than or equal to 2) first Josephson junctions spaced apart from each other and arranged in series; and a second Josephson junction arranged in parallel with the n first Josephson junctions, the second Josephson junction having a junction size smaller than that of the first Josephson junction. The first and second qubits are capacitively coupled to the one end of the coupler, respectively, and the third and fourth qubits are capacitively coupled to the other end of the coupler, respectively, wherein a magnitude of a coupling coefficient of the four-body interaction by the coupler is made configurable based on circuit parameters including at least the n and α (0<α<1) that is a ratio of a Josephson energy of the second Josephson junction and that of the first Josephson junction.

According to the present disclosure, there is provided a superconducting quantum circuit with a coupler configured to enable to strengthen a four-body interaction by circuit parameters.

Figure 5:
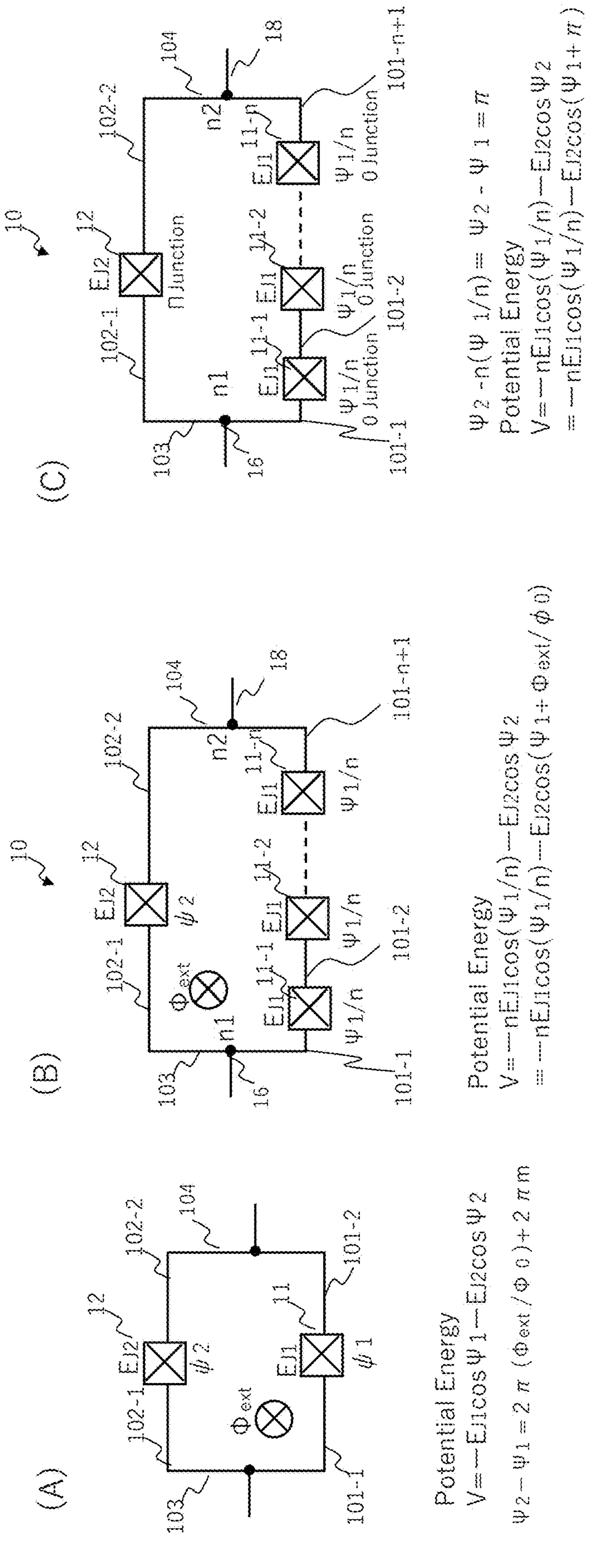

(A), (B), and (C) of FIG. 5 are diagrams illustrating embodiments.

Figure 6:
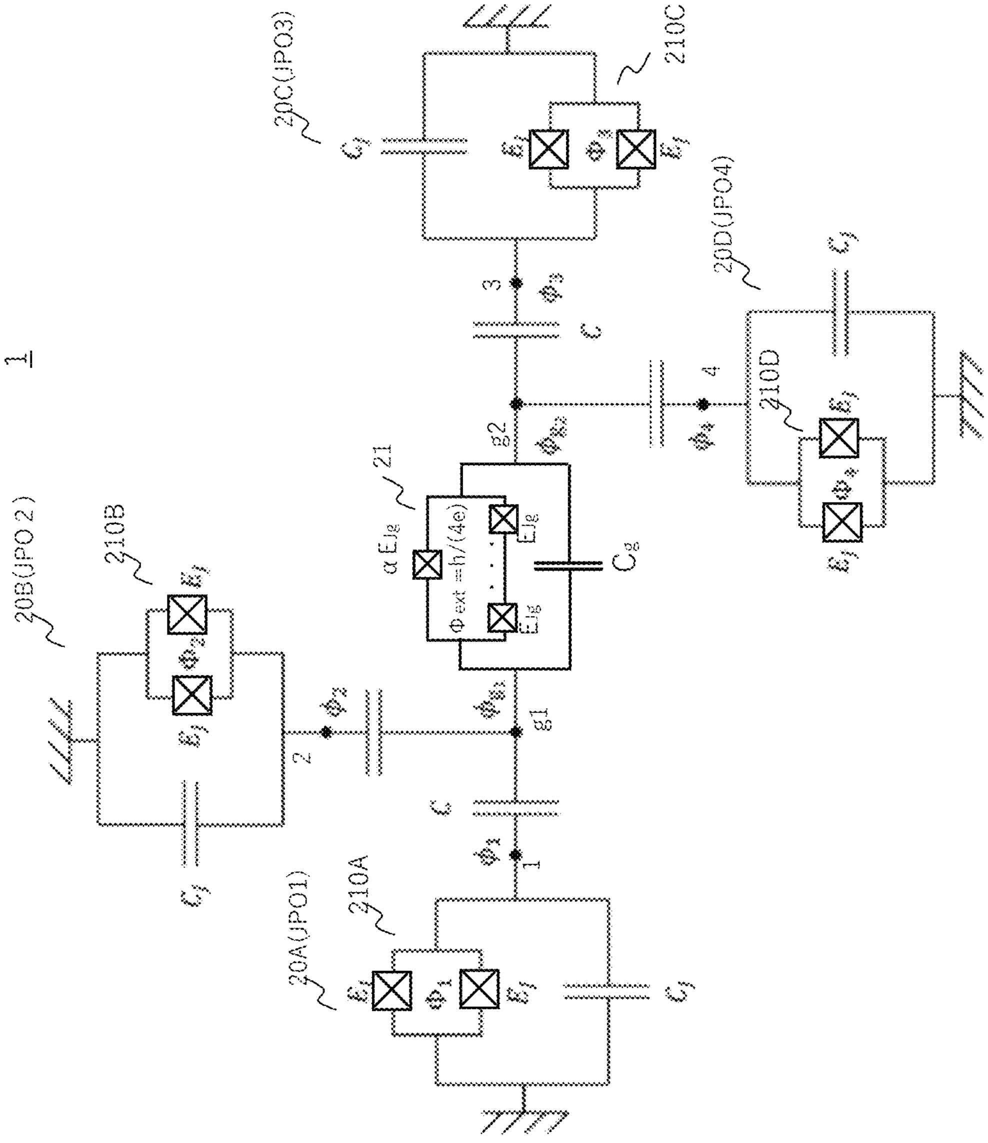

FIG. 6 is a diagram illustrating embodiments.

Figure 7:
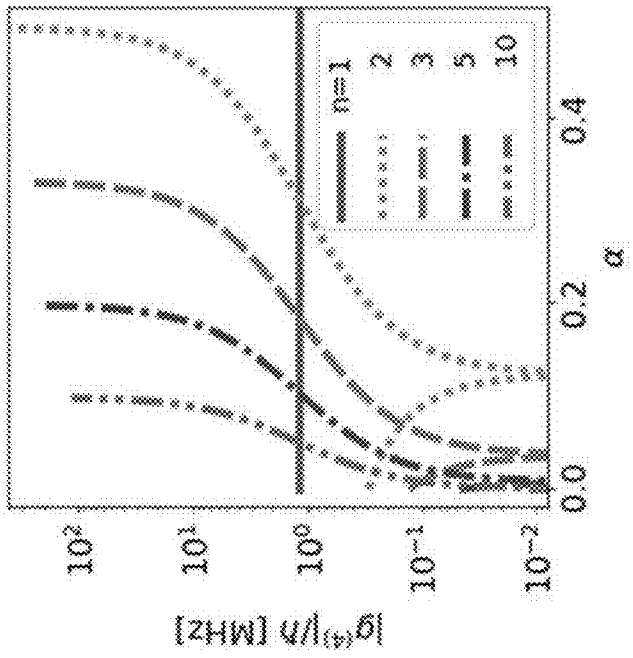

FIG. 7 is a diagram illustrating a strength of embodiments.

Figure 8:
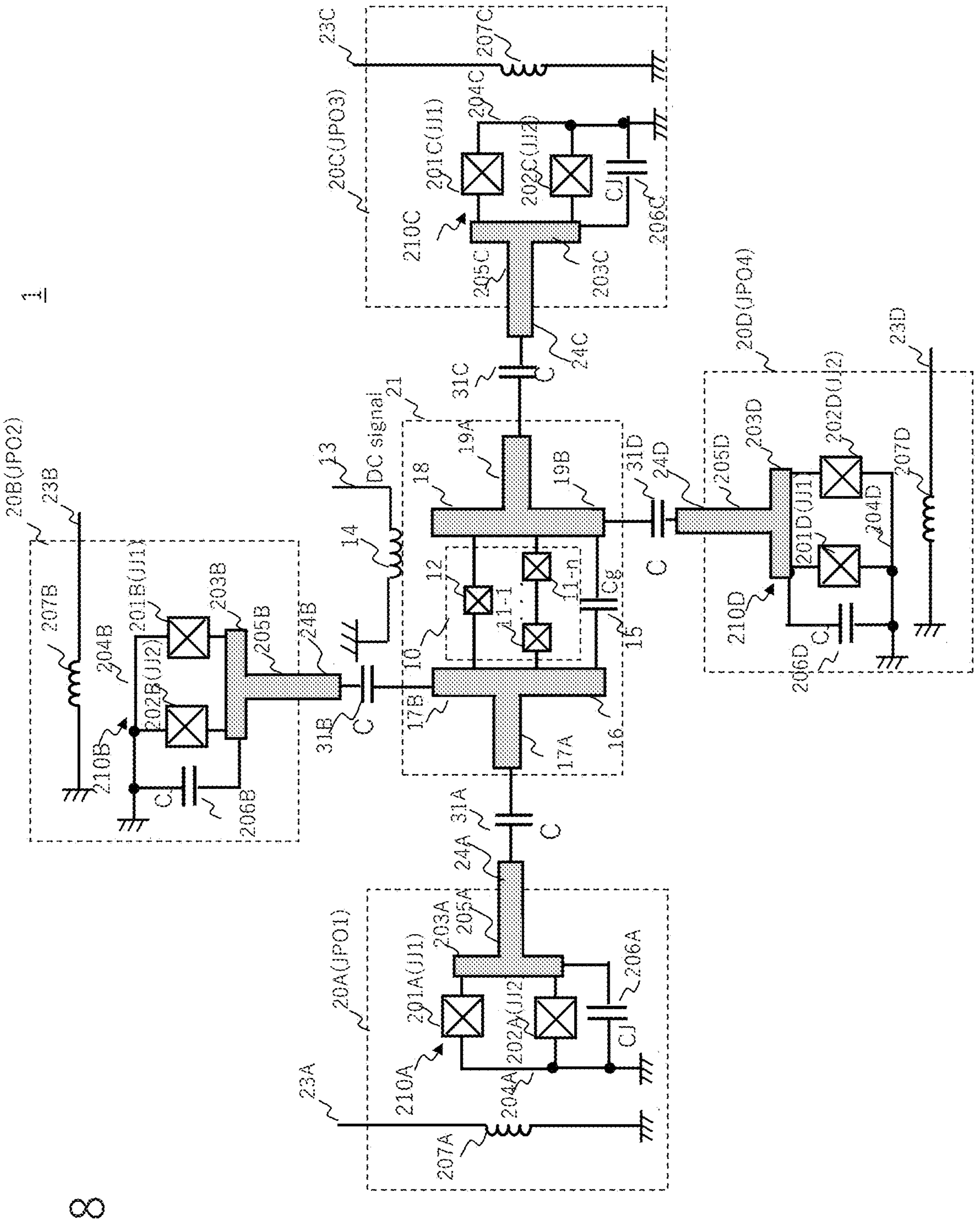

FIG. 8 is a diagram schematically illustrating embodiments.

Figure 9A:
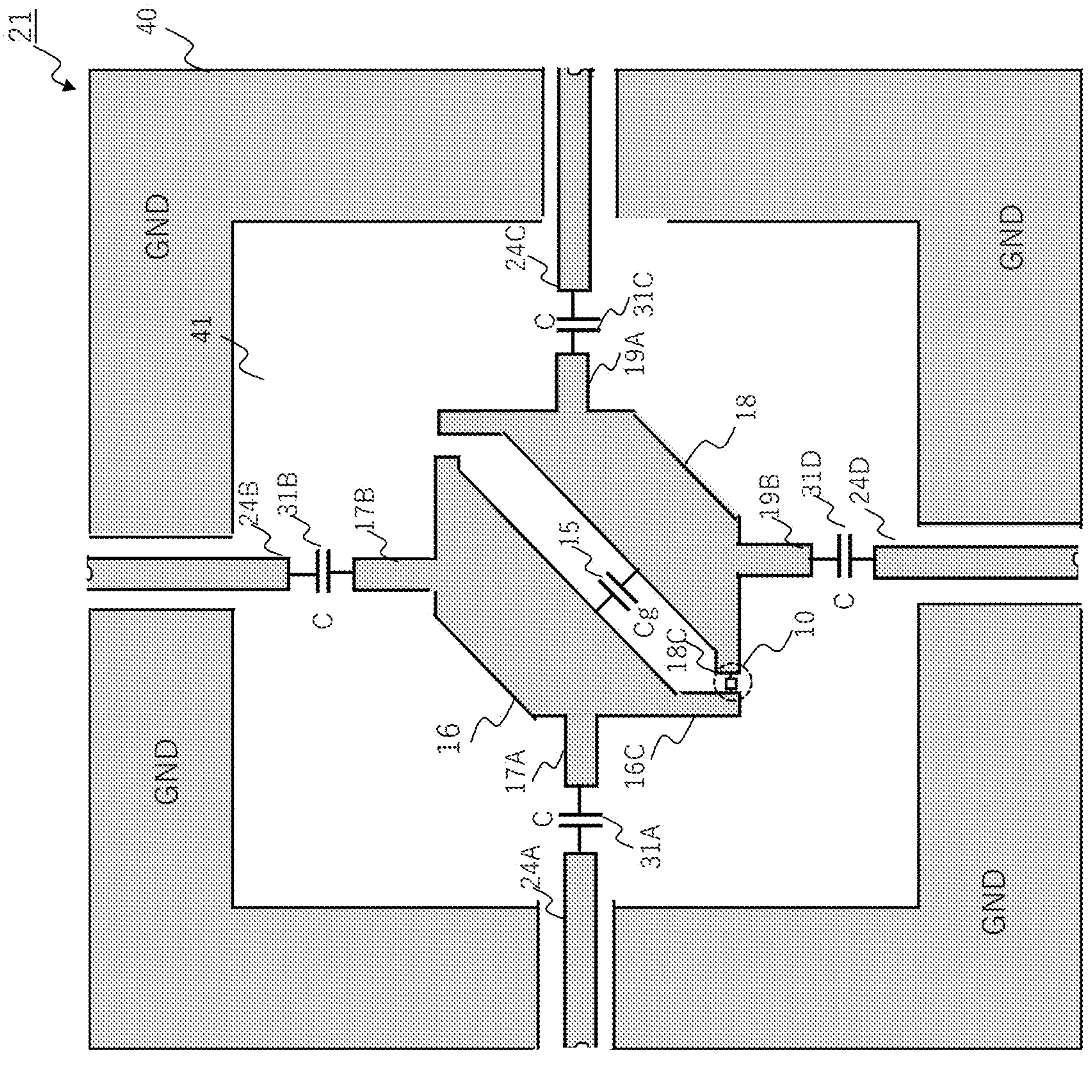

FIG. 9A is a diagram schematically illustrating one example of a coupler of example embodiments.

Figure 9B:
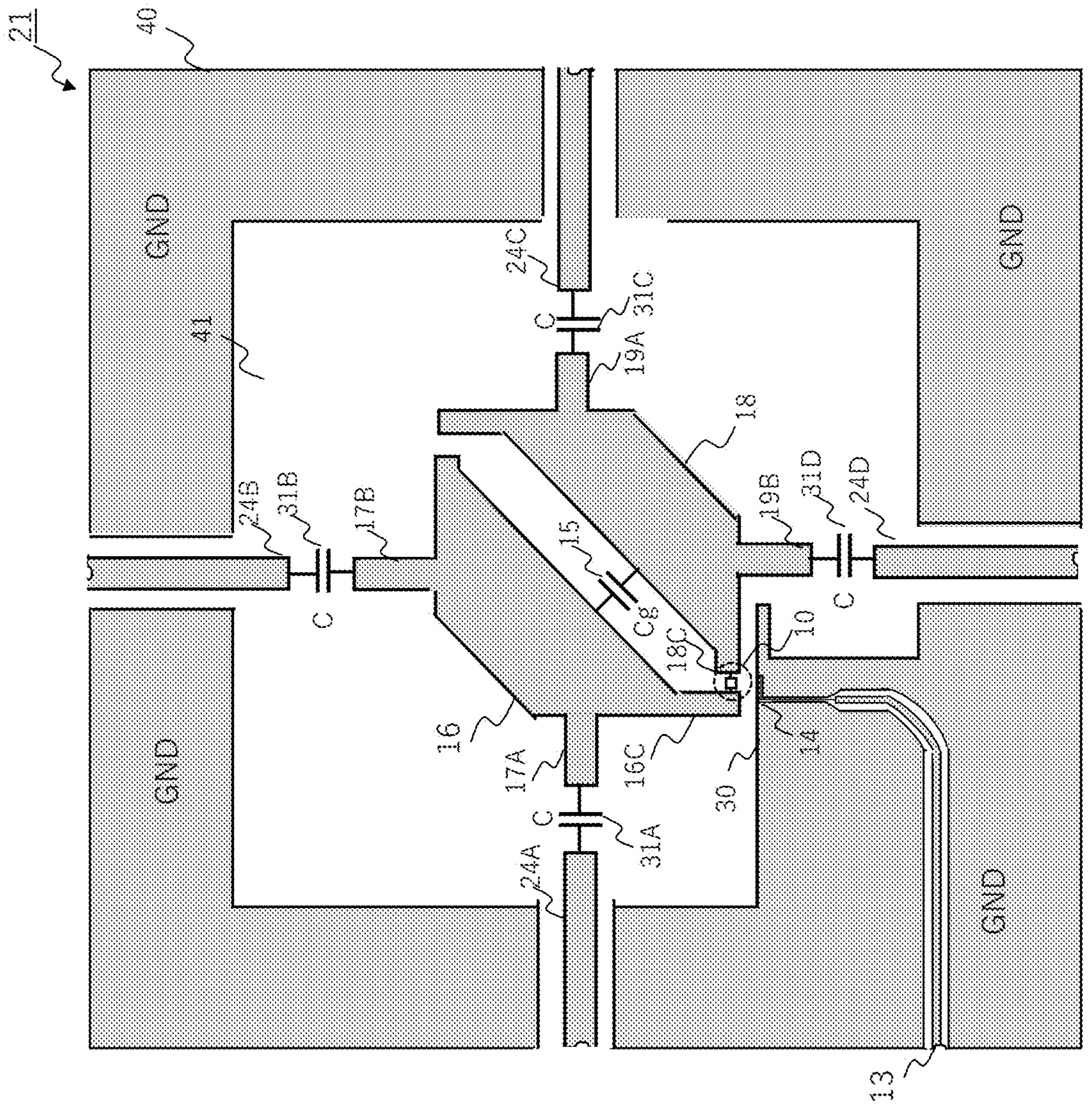

FIG. 9B is a diagram schematically illustrating another example of a coupler of example embodiments.

Figure 10:
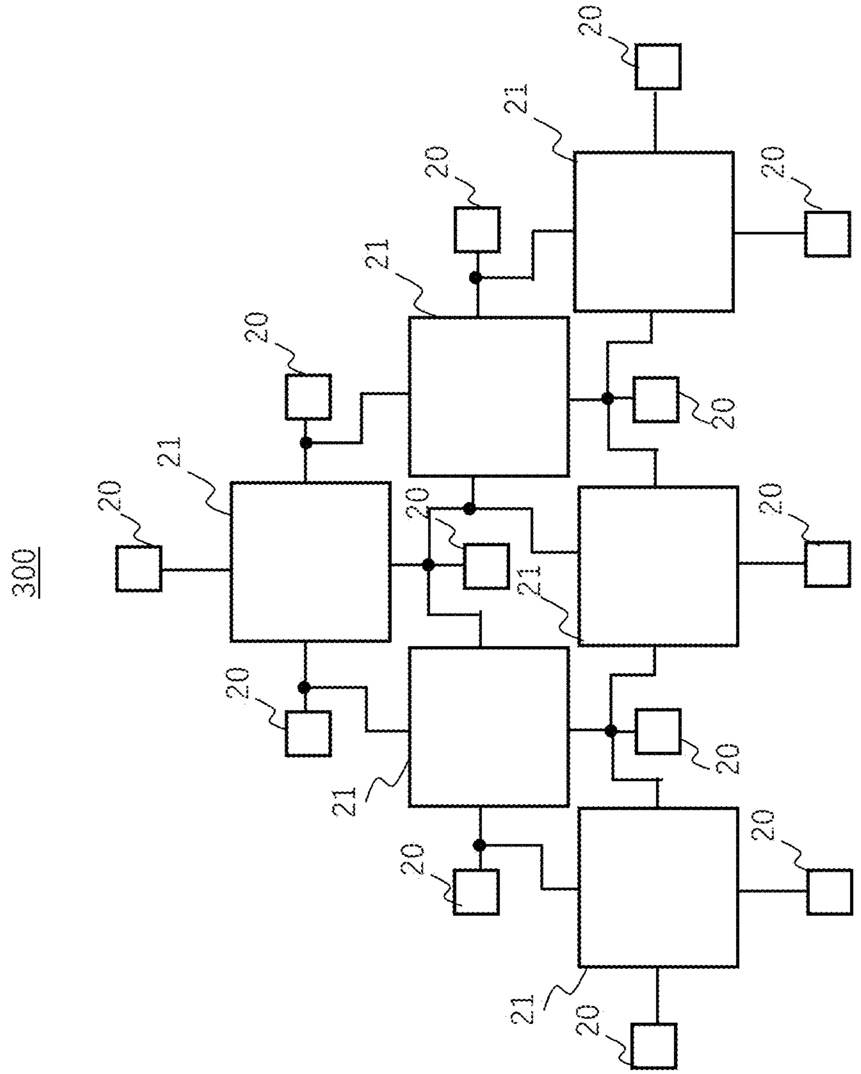

FIG. 10 is a diagram schematically illustrating embodiments.

EXAMPLE EMBODIMENTS

Figure 4A:
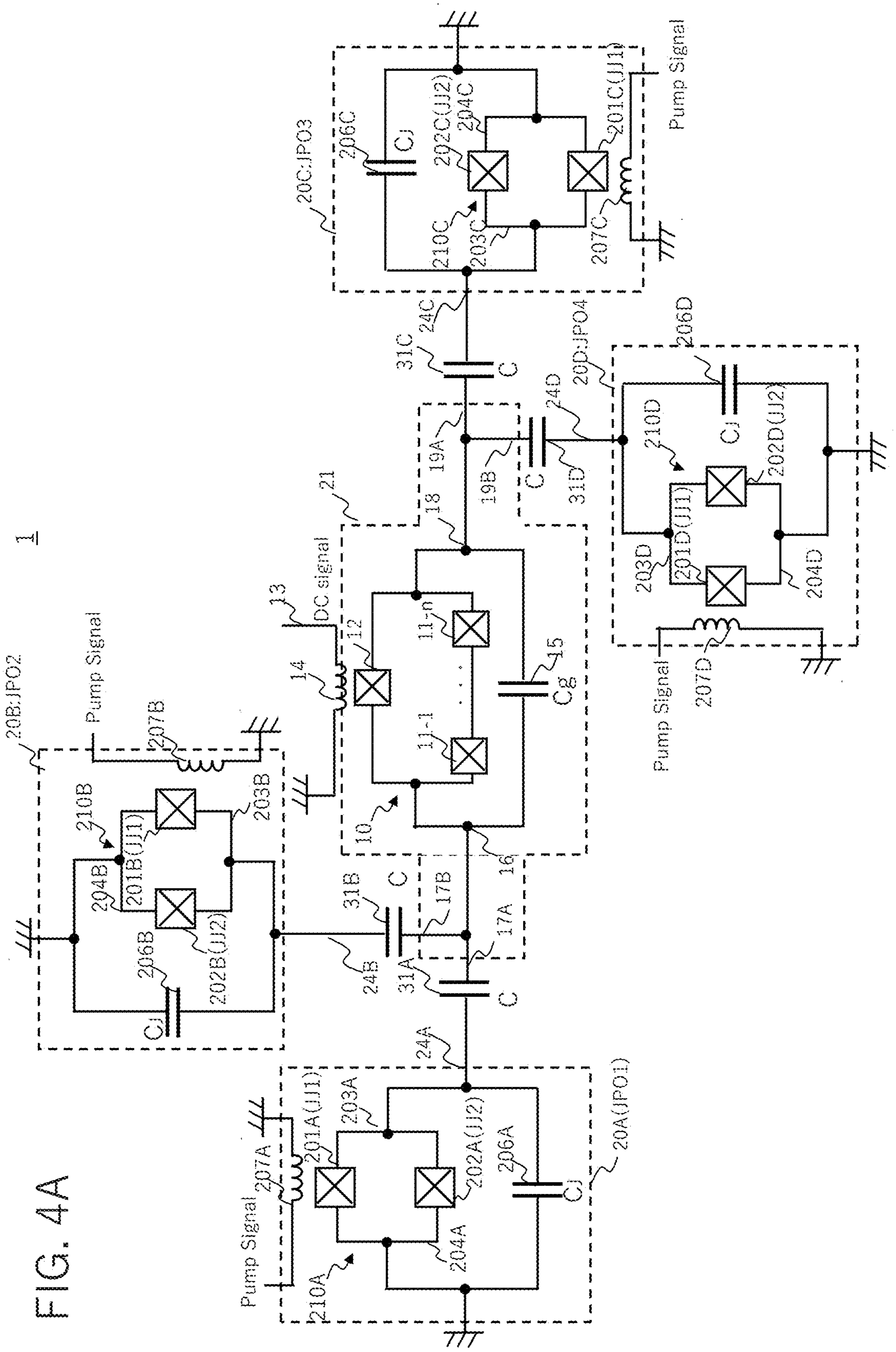
FIG. 4A is a diagram schematically illustrating an example of embodiments.

The following describes several embodiments. FIG. 4A is a diagram illustrating one embodiment. Referring to FIG. 4A, a superconducting quantum circuit 1 includes four JPOs: JPO 1 (20A) to JPO4 (20D) and a coupler 21. JPO 1 (20A) to JPO4 (20D) are connected to the coupler 21 by capacitive coupling via coupling capacitors 31A to 31D, respectively. In the following embodiments, an example of a lumped constant type circuit is described as each JPO, but each JPO may, as a matter of course, be a distributed constant type.

JPO1 (20A) to JPO4 (20D) include, respectively,
- SQUID (SQUID loop) 210A to 210D, in which first superconducting parts 203A to 203D, first Josephson junctions 201A to 201D, second superconducting parts 204A to 204D, and second Josephson junctions 202A to 202D are connected in a loop;
- magnetic field generation parts 207A to 207D including lines (inductors) inductively coupled to the SQUID loops 210A to 210D respectively, through which pump signals supplied to control lines 23A to 23D from signal generators not shown flow to generate magnetic fluxes that penetrate the SQUID loops 210A to 210D; and
- capacitors 206A to 206D connected, respectively, between the first superconducting parts 203A to 203D and the second superconducting parts 204A to 204D.

The second superconducting parts 204A to 204D of JPO1 (20A) to JPO4 (20D) are connected to ground.

Coupler connection portions 24A and 24B connected to the first superconducting parts 203A and 203B of JPO1 (20A) and JPO2 (20B) are connected to first and second opposing portions 17A and 17B of the coupler 21 via coupling capacitors 31A and 311B, respectively.

Coupler connection portions 24C and 24D connected to the first superconducting parts 203C and 203D of JPO3 (20C) and JPO4 (20D) are connected to third and fourth opposing portions 19A and 19B of the coupler 21 via coupling capacitors 31C and 31D, respectively.

The coupler 21 includes
- a loop circuit 10 that is connected to one end (first electrode) 16 and the other end (second electrode) 18 of the coupler 21 and includes a plurality of Josephson junctions (JJs); and
- a capacitor 15 that is connected in parallel to the loop circuit 10.

More specifically, the loop circuit 10 includes, between the one end (first electrode) 16 and the other end (second electrode) 18 of the coupler 21,
- first Josephson junctions 11-1 to 11-*n* that are connected in series and separated each other, and
- a second Josephson junction 12 that is connected in parallel with the first Josephson junctions 11-1 to 11-*n* between the one end (first electrode) 16 and the other end (second electrode) 18 of the coupler 21.

The magnetic field generation part 14 includes a line (inductor) inductively coupled to the loop circuit 10 of the coupler 21. A direct current signal may be supplied to the control line 13 from a current control part not shown to cause the magnetic field generation part 14 to generate a magnetic flux $\Phi_{ext}$ that penetrates the loop circuit 10 including the first and second Josephson junctions 11-1 to 11-*n* and the second Josephson junction 12. The magnetic field generation part 14 may be made of a coplanar superconducting line or superconducting coil, etc. with one end connected to the control line 13 and the other end connected to ground.

In the coupler 21 of FIG. 4A, n first Josephson junctions 11-1 to 11-*n* connected in series are connected such that ends of n+1 adjacent superconducting lines overlap each other, with n overlapping portions, each including a tunnel junction made up of (one end of a superconducting line)/(an insulating film)/(one end of a neighboring superconducting line). The other ends of the first and (n+1)-th superconducting lines are connected to the one end (first electrode) 16 and the other end (second electrode) 18 of the coupler 21, respectively.

Coupler connection portions 24A and 24B of JPO1 (20A) and JPO2 (20B) are capacitively coupled to one end (first electrode) 16 of the coupler 21, respectively, and coupler connection portions 24C and 24D of JPO3 (20C) and JPO4 (20D) are capacitively coupled to the other end (second electrode) 18 of the coupler 21, respectively. That is, in FIG. 4A, the first and second opposing portions 17A and 17B connected to the one end (first electrode) 16 of the coupler 21 are capacitively coupled to the coupler connection portions 24A and 24B of JPO1 (20A) and JPO2 (20B), respectively, via coupling capacitors 31A and 31B, and the third and fourth opposing portions 19A and 19B connected to the other end (second electrode) 18 of the coupler 21 are capacitively coupled to the coupler connection portions 24C and 24D of PO3 (20C) and JPO4 (20D), respectively, via coupling capacitors 31C and 31D.

$C_J$ denotes a capacitance of the capacitors 206A to 206D of JPO1 (20A) to JPO4 (20D), $C_g$ denotes a capacitance of the capacitor 15 of the coupler 21, and C denotes a capacitance of coupling capacitors 31A to 31D.

In the embodiments of the disclosure, the coupler 21 is configured to allow a coupling coefficient of the four-body interaction of JPO1 (20A) to JPO4 (20D) to be increased, as will be evident from the following description.

As illustrated in (A) of FIG. 5, in the SQUID, the first Josephson junction 11 is composed of a portion (tunnel junction) where ends of the superconducting lines 101-1 and 101-2 are in contact with each other via an insulating film (oxide film). The second Josephson junction 12 is composed of a portion (tunnel junction) where ends of the superconducting lines 102-1 and 102-2 are in contact with each other via an insulating film (oxide film). The superconducting lines 103 and 104, which are connected to the superconducting lines 101-1 and 102-1 and the superconducting lines 101-2 and 102-2, respectively, and the superconducting lines 101-1, 102-1, 101-2 and 102-2 may be the same or different superconducting members.

In a case where a magnetic flux $\Phi_{ext}$ penetrates the loop of the SQUID in (A) of FIG. 5, assuming that phase differences of the first and second Josephson junctions 11 and 12 are $\varphi 1$ and $\varphi 2$, respectively, and ignoring a linear inductance of the superconducting lines, the following holds.

$$\varphi_2 - \varphi_1 = \frac{\Phi_{ext}}{\phi_0} + 2m\pi, \; (m = 0, \pm 1, \pm 2, \ldots) \tag{2.1}$$

In Equation (2.1), $\phi_0$ is a magnetic flux quantum as according to Equation (1.5).

From Equation (2.1), $$\varphi_2 = \varphi_1 + \frac{\Phi_{ext}}{\phi_0} + 2m\pi, \; (m = 0, \pm 1, \pm 2, \ldots) \tag{2.2}$$

A potential energy $V(\varphi 1)$ of the SQUID loop in (A) of FIG. 5 is given by $$V(\varphi_1) = -E_{J1}\cos\varphi_1 - E_{J2}\cos\varphi_2 = -E_{J1}\cos\varphi_1 - E_{J2}\cos\left(\varphi_1 + \frac{\Phi_{ext}}{\phi_0}\right) \tag{2.3}$$

In Equation (2.3), $E_{J1}$ and $E_{J2}$ are Josephson energies of the first and second Josephson junctions 11 and 12.

$$E_{Ji} = \frac{\hbar}{2e} I_{C,i} \; (i = 1, 2) \tag{2.4}$$

where $I_{C,i}$ (i=1,2) are critical currents of the first and second Josephson junctions 11 and 12.

As illustrated in (B) of FIG. 5, the loop circuit 10 of the embodiments includes an array of n first Josephson junctions 11-1 to **11-*n*, spaced each other and connected in series between nodes n1 and n2, and the second Josephson junction 12 connected in parallel with the array. The n first Josephson junctions 11-1 to 11-*n* spaced each other and connected in series are composed of parts (tunnel junctions) where ends of a pair of adjacent lines among n+1 superconducting lines 101-1 to 101-*n*+1 are in contact with each other via an insulating film (oxide film). The superconducting lines 101-1 and 101-*n*+1 are connected to the superconducting lines 103 and 104, respectively. The superconducting lines 103 and 104 may constitute the first and second electrodes 16 and 18. The second Josephson junction 12 is composed of a portion (tunnel junction) where ends of the superconducting lines 102-1 and 102-2 are in contact with each other via an insulating film (oxide film), as with (A) of FIG. 5**.

As for the array of the n first Josephson junctions 11-1 to **11-*n* connected in series, if a phase difference between two ends of the array (between nodes n1 and n2) is $\varphi 1$ and a phase difference at the second Josephson junction 12 is $\varphi 2$, the above Equation (2.2) holds. A phase difference $\varphi$/n which is obtained by dividing the phase difference $\varphi 1$ between the two ends of the array equally, is a phase difference between an input and output at each Josephson junction 11-1 to 11-*n*. By summing individual potential energies of the n first Josephson junctions 11-1 to 11-*n***, $$-E_J\cos\left(\frac{\varphi_1}{n}\right) \tag{2.5}$$

a potential energy of the n first Josephson junctions 11-1 to **11-*n*** connected in series is obtained.

$$-nE_J\cos\left(\frac{\varphi_1}{n}\right) \tag{2.6}$$

It is known that the above Equation (2.6) holds when a capacitance of each first Josephson junction 11 is ignored. That is, assuming that the capacitance of the first Josephson junction is C1, the above Equation (2.6) holds under a condition that with respect to a charging energy $E_C = e^2/(2C1)$, the following hold, $$\exp\left\{-\sqrt{(8E_{Jg}/E_c)}\right\} \ll 1$$

and assuming a capacitance between the array of the first 11-1 to **11-*n*** Josephson junctions and ground is $C_s$, the following holds.

$$C1/Cs \gg n$$

(see NPL 2, NPL 3, etc.).

When the magnetic flux $\Phi_{ext}$ penetrates the loop circuit 10 in (B) of FIG. 5, the potential energy is given as follows.

$$V(\varphi_1) = -nE_{J1}\cos\left(\frac{\varphi_1}{n}\right) - E_{J2}\cos\left(\varphi_1 + \frac{\Phi_{ext}}{\phi_0}\right) \tag{2.7}$$

Here, the magnetic flux $\Phi_{ext}$ penetrating the loop circuit 10 is assumed to be given as follows.

$$\Phi_{ext} = \frac{\Phi_0}{2} = \frac{h}{4e} = \left(\frac{h}{2\pi}\right)\frac{1}{2e}\pi = \pi\phi_0 \tag{2.8}$$

In Equation (2.8), $\Phi_0$ is a magnetic flux quantum.

$$\Phi_0 = \frac{h}{2e} \tag{2.9}$$

$\Phi_0$ is a reduced magnetic quantum flux magnetic quantum flux of the above Equation (1.5).

From Equation (2.8), $$\frac{\Phi_{ext}}{\phi_0} = \pi \tag{2.10}$$

Therefore, from $$\cos\left(\varphi_1 + \frac{\Phi_{ext}}{\phi_0}\right) = \cos(\varphi_1 + \pi) = -\cos(\varphi_1)$$

Equation (2.7) becomes as follows.

$$V(\varphi_1) = -nE_{J1}\cos\left(\frac{\varphi_1}{n}\right) - E_{J2}\cos(\varphi_1 + \pi) = -nE_{J1}\cos\frac{\varphi_1}{n} + E_{J2}\cos\varphi_1 \quad (2.11)$$

A Josephson junction has a structure in which a junction barrier layer is sandwiched between two superconductors. An insulating layer or a nonmagnetic metal layer is used as the barrier layer. In this case, assuming that a critical current of the Josephson junction is $I_0$ and a phase difference across the junction (a phase difference of wave functions in the two superconductors sandwiching the junction) is φ, a superconducting current (Josephson current) is given as $$I_S = I_0\sin(\varphi) \quad (2.12)$$

In a ground state ($I_S$=0), the phase difference φ is 0 rad(radian). For this reason, it is also called a zero junction (0 junction). A Josephson junction with a nonmagnetic oxide film (e.g., AlOx) as a junction barrier layer is a zero junction.

In contrast, in a Josephson junction (ferromagnetic Josephson junction) using a ferromagnetic layer (e.g., copper-nickel alloy (CuNi) or palladium-nickel alloy (PdNi) or ferromagnetic insulating layer) as a barrier layer between the first and second superconductors, depending on a thickness of the ferromagnetic layer, a zero junction and a π junction alternately change.

Here, a π junction is a junction where the following holds.

$$I_S = -I_0\sin(\varphi) = I_0\sin(\varphi + \pi) \quad (2.13)$$

A phase difference differs from the zero junction by π rad in the ground state. For example, when a thickness dF of the ferromagnetic layer is less than a predetermined value t1, a state is zero (0), and when t1<dF<t2, a state is π. By using a π junction instead of a zero junction, the phase difference can be shifted by π in the loop including the π junction. In a loop including an odd number of Tr junctions, the phase difference around the loop is ±π×(odd number).

(C) of FIG. 5 schematically illustrates an example of a loop circuit 10 using a π junction. Although not limited thereto, in the example of (C) of FIG. 5, n first Josephson junctions 11-1 to 11-*n* are zero-junctions and the second Josephson junction 12 is a π-junction. As for an array of the n first Josephson junctions 11-1 to 11-*n* connected in series, assuming that a phase difference between the two ends of the array (between nodes n1 and n2) is φ1 and a phase difference at the second Josephson junction 12 is φ2, then an extra phase difference of π is generated as compared to the phase difference φ2–φ1 by circumambulation of the loop circuit 10. Thus, the following holds.

$$\varphi_2 - \varphi_1 = \pi \quad (2.14)$$

Therefore, a potential energy of the second Josephson junction 12 is, $$-E_{j2}\cos(\varphi_2) = -E_{j2}\cos(\varphi_1 + \pi) \quad (2.15)$$

The potential energy V(φ1) of the loop circuit 10 is identical to the above Equation (2.11). That is, in a case where the loop circuit 10 is configured to include an odd number of π junctions (in (C) of FIG. 5, there is one π junction), without applying an external magnetic flux $\Phi_{ext}$ to the loop circuit 10 (with the magnetic flux $\Phi_{ext}$=0), the loop circuit 10 can be set in a state equivalent to be biased with the magnetic flux $\Phi_0/2$ (or $-\Phi_0/2$) (where $\Phi_0$ (=h/(2e) is a magnetic flux quantum). Therefore, when the loop circuit 10 is configured to include an odd number of π junctions, the magnetic field generation part 14 and control line 13 of FIG. 4A are unnecessary, as illustrated in FIG. 4B.

Figure 4B:
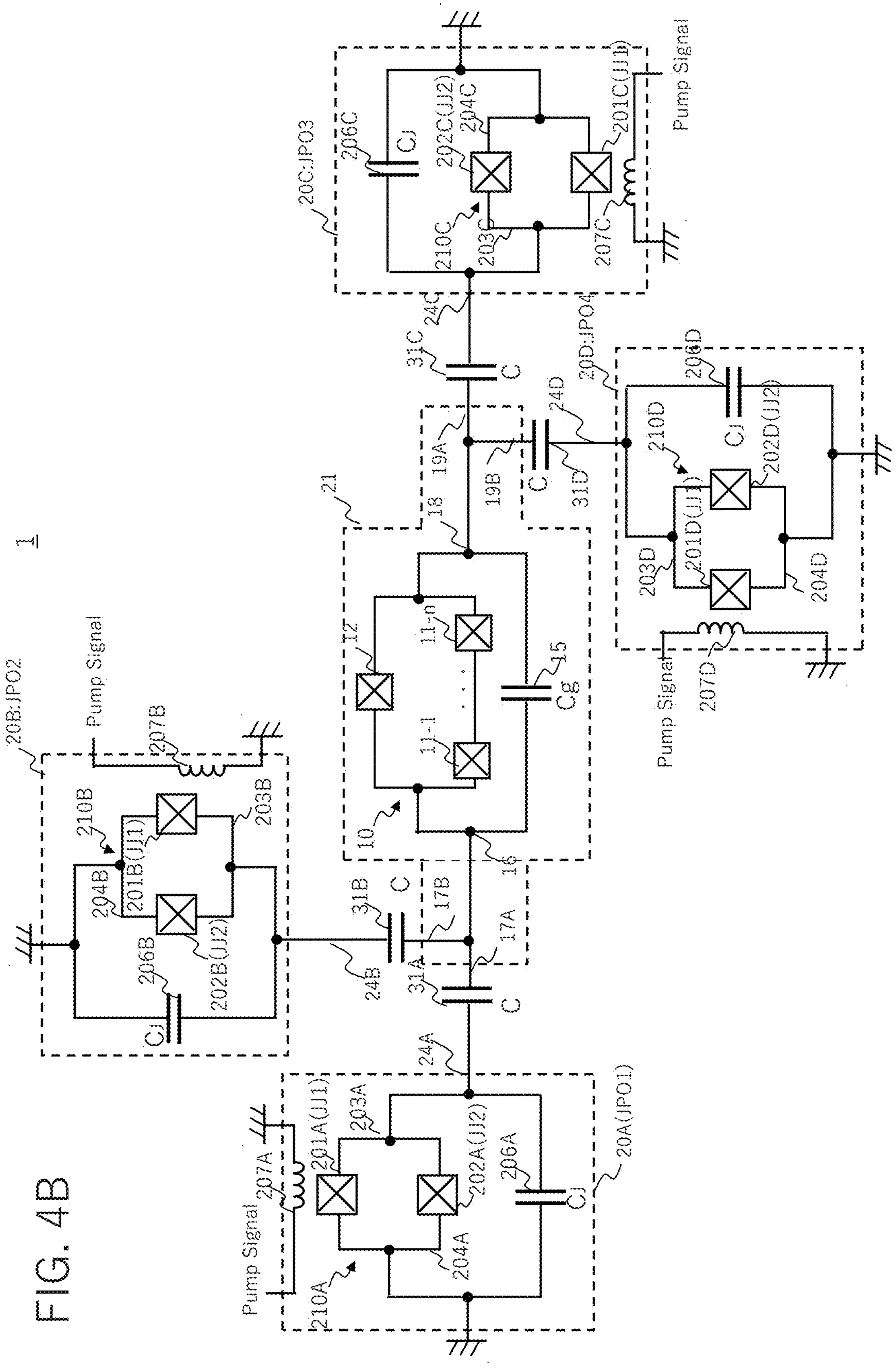
FIG. 4B is a diagram schematically illustrating another example of embodiments.

Regarding a potential energy of the loop circuit 10 of the coupler 21 in FIG. 4A or FIG. 4B, the following notations are used in (B) or (C) of FIG. 5.

$$\varphi 1 = \varphi_g,\ E_{J1} = E_{Jg},\ E_{J2} = \alpha E_{Jg} \text{ (where } 0 < \alpha < 1)$$

Equation (2.11) becomes the following Equation (2.16).

$$V_g(\varphi_g) = -nE_{Jg}\cos\left(\frac{\varphi_g}{n}\right) + \alpha E_{Jg}\cos\varphi_g \quad (2.16)$$

In Equation (2.16), each Josephson energy $E_{Jg}$ of the first Josephson junctions 11-1 to 11-*n* is given as $$E_{Jg} = \frac{\hbar}{2e} I_{Cg} \quad (2.17)$$

(where $I_{cg}$ is a critical current of each first Josephson junction)

The Josephson energy $E_{J2}$ of the second Josephson junction 12 is set to be α times (0<α<1) each Josephson energy $E_{Jg}$ of the first Josephson junctions 11-1 to 11-*n*. Since the Josephson energy is proportional to a critical current, the critical current of the second Josephson junction 12 is set to be α times (0<α<1) each critical current $I_{cg}$ of the first Josephson junctions 11-1 to 11-*n*. A critical current value of a Josephson junction is proportional to a junction size (junction area) of the Josephson junction. Therefore, the junction size of the second Josephson junction 12 is smaller than that of each of the first Josephson junctions 11-1 to 11-*n*. The junction size of the second Josephson junction 12 is α times (0<α<1) a junction size of each of the first Josephson junctions 11-1 to 11-*n*. The same is also true for a case when n first Josephson junctions 11-1 to 11-*n* and the second Josephson junction 12 are both zero-junctions, and for a case when n first Josephson junctions 11-1 to 11-*n* are zero-junctions and the second Josephson junction 12 is a π-junction.

In Equation (2.16), cosine is subjected to a Tayler expansion, in which up to $$\varphi_g^4$$

are considered (higher order terms after $$\varphi_g^6$$

are ignored).

$$V_g(\varphi_g) = -(n-\alpha)E_{Jg} + \frac{E_{Jg}^{(2)}}{2}\varphi_g^2 - \frac{E_{Jg}^{(4)}}{24}\varphi_g^4 + O(\varphi_g^6) \quad (2.18)$$

where $$E_{Jg}^{(2)} = \left(\frac{1}{n} - \alpha\right)E_{Jg} \quad (2.19)$$

$$E_{Jg}^{(4)} = \left(\frac{1}{n^3} - \alpha\right)E_{Jg} \quad (2.20)$$

The first term on the right side of Equation (2.18) is a constant term and does not affect the later discussion and thus by ignoring the first term, $V_g(\varphi_g)$ is expressed as follows.

$$V_g(\varphi_g) \cong \frac{E_{Jg}^{(2)}}{2}\varphi_g^2 - \frac{E_{Jg}^{(4)}}{24}\varphi_g^4 \quad (2.21)$$

In a case where n=1 and α=0, there is provided a single first Josephson junction, corresponding to the coupler in NPL 1, and the following holds.

$$E_{Jg}^{(2)} = E_{Jg}^{(4)} = E_{Jg}.$$

In a case where n>=2, $E_{Jg}^{(2)} \neq E_{Jg}^{(4)}$. This difference affects the coupling coefficient of the four-body interaction.

Figure 3:
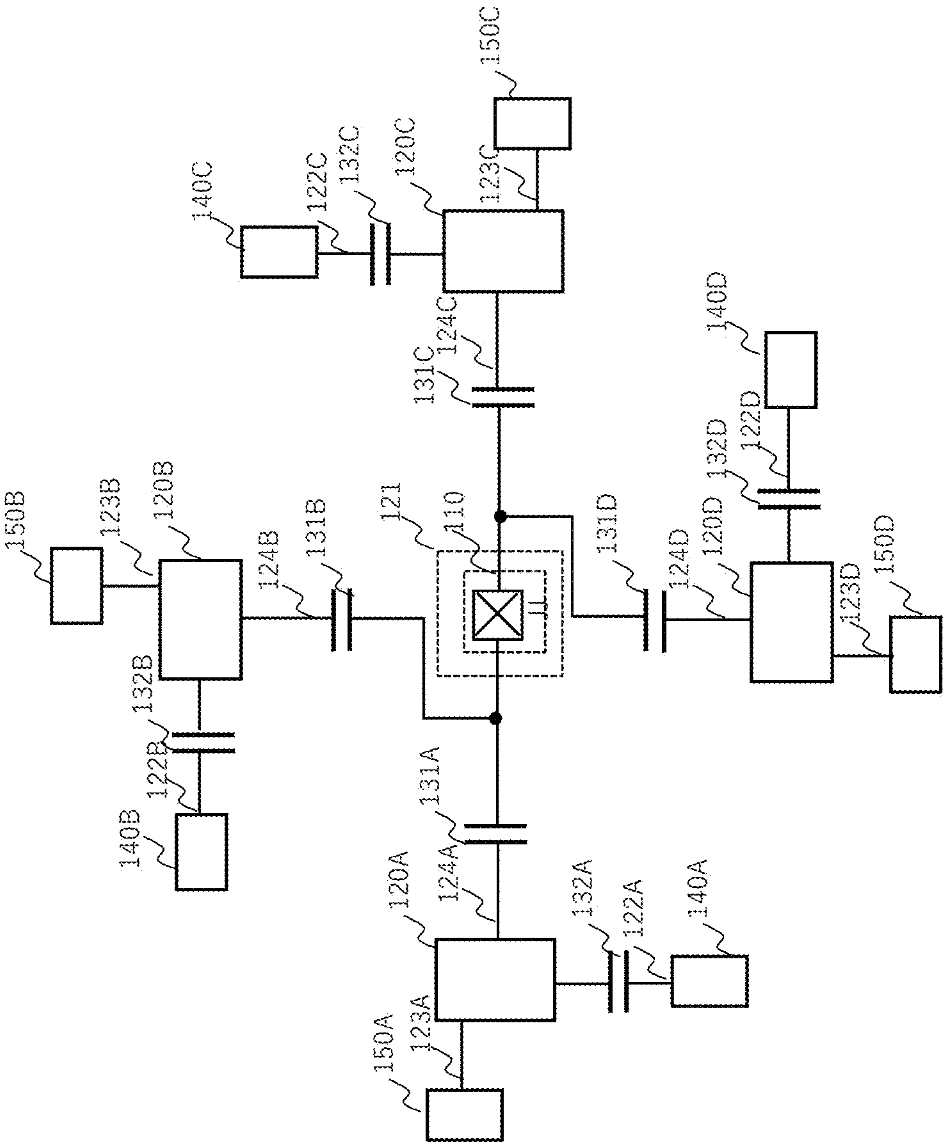
FIG. 3 is a diagram schematically illustrating a related art.

FIG. 6 illustrates the four-body interaction of four JPO1 (20A) to JPO4 (20D) described with reference to FIG. 3 to FIG. 5. FIG. 6 corresponds to FIG. 4A and FIG. 4B. In FIG. 6, the magnetic field generation parts 207A to 207D and 14 of FIG. 4A are not shown. In FIG. 6, Josephson junctions are indicated by symbols with an X surrounded by a square. $\Phi_1$ to $\Phi_4$ in the SQUID loops 210A to 210D of JPO1 (20A) to JPO4 (20D) each represent a magnetic flux that penetrates each SQUID loop. $E_J$ attached to each of the two Josephson junctions in the SQUID loops 210A to 210D of JPO1 to JPO4 represents the Josephson energy.

$$E_J = \left(\frac{\hbar}{2e}\right)I_c \quad (2.22)$$

$E_{Jg}$ represents a Josephson energy of the first Josephson junction 11 of the coupler 21 (Equation (2.17)).

Fluxes ϕ1 to ϕ4, ϕg1, and ϕg2 are placed at each node 1 to 4, g1 and g2, respectively (reference may be made to, e.g., NPL3 for fluxes placed at each node). A classical Hamiltonian for the circuit shown in FIG. 7 is as follows.

$$H = \frac{1}{2}g^t C_{mat}^{-1} q + V(\phi) \quad (2.23)$$

In Equation (2.23), $C_{mat}^{-1}$ is an inverse matrix of a capacitance connection (incidence) matrix (6 rows by 6 columns) $C_{mat}$ in FIG. 6.

$$C_{mat} = ((C_J + C, 0, 0, 0, -C, 0), (0, C_J + C, 0, 0, -C, 0), (0, 0, C_J + C, 0, 0, -C), (0, 0, 0, C_J + C, 0, -C), (-C, -C, 0, 0, C_g + 2C, -C_g), (0, 0, -C, -C, -C_g, C_g + 2C)) \quad (2.24)$$

$$q = (q_1, q_2, q_3, q_4, q_{g1}, q_{g2})^t \quad (2.25)$$

$$\dot{\phi} = (\dot{\phi}_1, \dot{\phi}_2, \dot{\phi}_3, \dot{\phi}_4, \dot{\phi}_{g1}, \dot{\phi}_{g2})^t \quad (2.26)$$

V(ϕ) is a sum of a sum of potential energies $V_{squid,i}$ (i=1 to 4) of the SQUIDs in JPOi (i=1 to 4) and a potential energy $V_{coupler}$ of the coupler 21 in Equation (2.20).

$$V(\phi) = \sum_{i=1}^{4} V_{squid,i} + V_{coupler} \quad (2.27)$$

$V_{squid,i}$ (i=1 to 4) is derived by assuming that $E_{J1}=E_{J2}=E_J$, ignoring the term cos(φi) and taking out the term including $\phi_i/\phi_0$ in Equation (2.3) of the potential energy of the SQUID of JPOs 1 to 4.

$$V_{squid,i} = -E_J(\Phi_i)\cos\frac{\phi_i}{\phi_0} \quad (2.28)$$

where $\Phi_i$ and $\Phi_i$ (i=1~4) are an external magnetic flux $\Phi_i$ and a flux $\Phi_i$ at node i in FIG. 6.

From Equation (2.21) and fluxes $\phi_{g1}$ and $\phi_{g2}$ of nodes g1 and g2 in FIG. 6, $V_{coupler}$ is given as follows.

$$V_{coupler} = V_g\left(\frac{\phi_{g1} - \phi_{g2}}{\phi_0}\right) \quad (2.29)$$

For the Hamiltonian of the circuit shown in FIG. 6, a coordinate ϕ and a momentum q are quantized using creation and annihilation operators $a^+$ and a of a boson (Cooper pair) according to the standard method according to NPL 3, etc. Here, a phase $\varphi_k=\phi_k/\phi_0$ and the number of bosons (Cooper pairs) $n_k=q_k/2e$ (k=1,2,3,4,g1,g2) are quantized using creation and annihilation operators of a boson.

$$\frac{\phi_k}{\phi_0} = \varphi_k \to \hat{\varphi}_k = \varphi_{kZ}(a_k + a_k^\dagger),\ (k = 1, 2, 3, 4, g1, g2) \quad (2.30)$$

$$\frac{g_k}{2e} = n_k \to \hat{n}_k = -in_{kZ}(a_k - a_k^\dagger),\ (k = 1, 2, 3, 4, g1, g2) \quad (2.31)$$

$$\varphi_{kZ} = \sqrt{\frac{Z_k}{2}},\ (k = 1, 2, 3, 4, g1, g2) \quad (2.32)$$

$$n_{kZ} = \sqrt{\frac{1}{2Z_k}},\ (k = 1, 2, 3, 4, g1, g2) \quad (2.33)$$

In Equations (2.32) and (2.33), $$Zi = \sqrt{\frac{8E_C}{E_J}}\quad (k = 1, 2, 3, 4) \quad (2.34)$$

-continued $$Z_{g1} = Z_{g2} = \sqrt{\frac{2E'_{Cg}}{E_{Jg}^{(2)}}} \tag{2.35}$$

In Equation (2.34), $E_C$ is a charging energy of the capacitor $C_J$. In Equation (2.35), $E'_{Cg}$ is an effective energy with an effect of coupling with JPO taken into a charging energy of the capacitor Cg of the coupler 21.

Let $a^+_k$ and $a_k$ (k=1,2,3,4,g1,g2) be creation and annihilation operators of a boson. The coupler 21 has two flux degrees of freedom $\phi_{g1}$ and $\phi_{g2}$.

The following operators are defined for $\hat{\varphi}_k$, $\hat{n}_k$, and $a_k$ (k=g1,g2).

$$\hat{\varphi}_{g\pm} = \hat{\varphi}_{g1} \pm \hat{\varphi}_{g2} = \varphi_{gZ}(a_{g\pm} + a^\dagger_{g\pm}) \tag{2.36}$$

$$n_{g\pm} = \frac{\hat{n}_{g1} \pm \hat{n}_{g2}}{2} = -i n_{gZ}(a_{g\pm} - a^\dagger_{g\pm}) \tag{2.37}$$

$$a_{g\pm} = \frac{a_{g1} \pm a_{g2}}{\sqrt{2}} \tag{2.38}$$

In Equation (2.36), $$\varphi_{gZ} = \sqrt{\frac{Z_g}{2}} \tag{2.39}$$

In Equation (2.37), $$n_{gZ} = \sqrt{\frac{1}{2Z_g}} \tag{2.40}$$

$Z_g$ in Equations (2.39) and (2.40) is given by $$Z_g = 2Z_{g1} = 2Z_{g2} = \sqrt{\frac{8E'_{Cg}}{E_{Jg}^{(2)}}} \tag{2.41}$$

$\mathrm{Cos}(\phi_i/\phi_0)$ in Equation. (2.28) is expressed in terms of creation and annihilation operators of a boson using a Tayler expansion to the fourth order, as follows.

$$\cos\frac{\phi_i}{\phi_0} = 1 - \frac{1}{2}\left(\frac{\phi_i}{\phi_0}\right)^2 + \frac{1}{24}\left(\frac{\phi_i}{\phi_0}\right)^4 = 1 - \frac{\varphi_Z^2}{2}(a_i + a_i^\dagger)^2 + \frac{\varphi_Z^4}{2}(a_i + a_i^\dagger)^4 \tag{2.42}$$

In Equation (2.28), with respect to the magnetic flux $\phi_i$ that penetrates the loop of each SQUID of $\mathrm{JPO}_i$(i=1,2,3,4), a pump wave with an angular frequency $\omega_{p,i}$ is applied such that the following holds.

$$E_J(\Phi_i) = E_J + \delta E_J \cos(\omega_{p,i} t) \tag{2.43}$$

The function $V_g$ in Equation (2.29) is defined by Equation (2.16) and thus contains a term $\cos((\phi_{g1}-\phi_{g2})/\phi_0)$, which is expanded as follows as with Equation (2.42).

$$\begin{aligned}\cos\frac{\phi_{g1}-\phi_{g2}}{\phi_0} &= 1 - \frac{1}{2}\left(\frac{\phi_{g1}-\phi_{g2}}{\phi_0}\right)^2 + \frac{1}{24}\left(\frac{\phi_{g1}-\phi_{g2}}{\phi_0}\right)^4 \\ &= 1 - \frac{\varphi_{gZ}^2}{2}(a_{g-} + a_{g-}^\dagger)^2 + \frac{\varphi_{gZ}^4}{2}(a_{g-} + a_{g-}^\dagger)^4\end{aligned} \tag{2.44}$$

A quantized Hamiltonian is expressed by $$H_{total} = \sum_{i=1}^{4} H_{JPO,i} + g_+ \sum_{i=1}^{4} (a_i^\dagger - a_i)(a_{G-} - a_{G-}^\dagger) + g_- \sum_{i=1}^{4} s_i (a_i^\dagger - a_i)(a_{g-} - a_{g-}^\dagger) + H_{coupler} \tag{2.45}$$

In Equation (2.45), $H_{JPO,i}$ is a Hamiltonian of each JPOi (i=1,2,3,4) and is given by, $$H_{JPO,i} = \sum_{i=1}^{4}\left[\omega a_i^\dagger a_i - \frac{E_C}{2}(a_i + a_i^\dagger)^4 + \frac{\delta E_J \omega}{4E_J}(a_i + a_i^\dagger)^2 \cos(\omega_{p,i} t)\right] \tag{2.46}$$

In Equation (2.45), $H_{coupler}$ is a Hamiltonian of the coupler 21 and is given by the following Equation (2.47).

$$H_{coupler} = \omega_+ a_{g+}^\dagger a_{g+} - \frac{\omega_+}{2}(a_{g+}^2 + a_{g+}^{\dagger 2}) + \omega_- a_{g-}^\dagger a_{g-} - \frac{E'_{Cg}}{12}\frac{E_{Jg}^{(4)}}{E_{Jg}^{(2)}}(a_{g-} + a_{g-}^\dagger)^4 \tag{2.47}$$

In Equations (2.46) and (2.47), ω s a resonant angular frequency of the JPO corresponding to $a_i$, $\omega_+$ and $\omega_-$ are resonant angular frequencies of the coupler 21 corresponding to $a_{g+}$ and $a_{g-}$, respectively. A difference in an angular frequency between different JPOs is not taken into consideration.

$H_{total}$ includes an interaction between each JPO and the coupler 21. In Equation (2.45), $g_+$ and $g_-$ are a strength of an interaction between each JPO and the two degrees of freedom of the coupler 21.

In Equation (2.45), $$s1 = s2 = 1,\ s3 = s4 = -1 \tag{2.48}$$

Since each JPO interacts with the coupler 21, it can be assumed that JPOs are also indirectly interacted with each other through the interaction with coupler 21. With a variable transformation to a form in which an influence of the coupler 21 on each JPO is incorporated, an interaction between JPOs 1 to 4 and the coupler 21 is transformed into a four-body interaction among JPOs. That is, it can be transformed to a Hamiltonian with a form in which JPOs are interacting directly with each other. This transformation can be expressed as a unitary transformation by the following unitary matrix U.

$$U = \tag{2.49}$$

-continued $$\exp\left\{-\frac{g_+}{\omega-\omega_+}\left[\sum_{i=1}^{4}(a_i^\dagger a_{g+}-a_i a_{g+}^\dagger)\right]-\frac{g_-}{\omega-\omega_-}\left[\sum_{1=1}^{4}(a_i^\dagger a_{g-}-a_i a_{g-}^\dagger)\right]\right\}$$

where ω, $\omega_+$ and $\omega_-$ are resonant angular frequencies corresponding to $a_i$, $a_{g+}$ and $a_{g-}$ (where a frequency difference between different JPOs is not considered). $g_+/(\omega-\omega_+)$ and $g_-/(\omega-\omega_-)$ are assumed to be less than 1.

The above unitary transformation looks similar to one in NPL 1, but it differs from NPL 1 in that NPL 1 considers only one degree of freedom of the coupler. After performing the unitary transformation, a boson of each JPO is represented by a rotated coordinate system. A frequency of rotation of the coordinate system is different for each JPO. As for JPOs 1 to 4, the coordinate system is represented by one that rotates at half the frequency of a pump signal to generate a magnetic flux penetrating the SQUID loop in each of JPOs 1 to 4. The pump frequency is different for each JPO. A transition to the rotating coordinate system causes an oscillating term(s) to appear in the Hamiltonian in time, but the oscillating term(s) can be ignored (rotating wave approximation) because they are averaged and their positive and negative values would cancel out on a time scale of interest here.

Due to a difference in frequencies of the pump signals, many of terms representing an interaction among JPOs and an interaction between each JPO and the coupler 21, which can oscillate and are ignored for the above reasons. By paying attention to various transformations and characteristic time scales described above, an estimation of a strength of the interaction among JPOs that occurs through the coupler 21 is made possible. The Hamiltonian $H'_{total}$ obtained through the above process can be expressed as the following Equation (2.50) by focusing on the four-body interaction term.

$$H'_{total} = \sum_{i=1}^{4} H'_{JPO,i} - g^{(4)}\left(a_1^\dagger a_2^\dagger a_3 a_4 + a_1 a_2 a_3^\dagger a_4^\dagger + \sum_{i<j} a_i^\dagger a_i a_j^\dagger a_j\right) + H'_{coupler} \quad (2.50)$$

In Equation (2.50), $H'_{JPO,i}$ (i=1, 2, 3, 4) is each Hamiltonian of JPO1 (20A) to JPO4 (20D).

$H'_{coupler}$ is a Hamiltonian of coupler 21.

$a^+_k$ and $a_k$ (k=1, 2, 3, 4) are creation and annihilation operators of a boson corresponding to JPO1 (20A) to JPO4 (20D).

In Equation (2.50), $g^{(4)}$ is a coefficient (coupling coefficient) representing a strength of coupling of the four-body interaction and expressed by the following Equation (2.51), using:

- α which is a ratio of the Josephson energy of the second Josephson junction 12 to that of the first Josephson junction 11 in the coupler 21 (ratio of the junction size of the Josephson junctions);
- n which is a number of the first Josephson junctions 11 connected in series in the coupler 21;
- a capacitance Cg of the coupler 21;
- a coupling capacitance C of a capacitive coupling between the coupler 21 and each JPO; and
- a resonance angular frequency ω of each JPO and a resonance angular frequency $\omega_-$ of the coupler 21.

$$g^{(4)} = \frac{1}{2^8}\frac{(\omega\omega_-)^2}{(\omega-\omega_-)^4}\cdot\frac{C^4}{C_J^2(C_g+C)^3}\cdot\left(\frac{E_{Jg}^{(4)}}{E_{Jg}^{(2)}}\right)\cdot e^2 = \frac{1}{2^8}\frac{(\omega\omega_-)^2}{(\omega-\omega_-)^4}\cdot\frac{C^4}{C_J^2(C_g+C)^3}\cdot\left\{\frac{1-n^3\alpha}{n^2(1-n\alpha)}\right\}\cdot e^2 \quad (2.51)$$

In Equation (2.51), the resonant angular frequency ω of each JPO is given by (2.52)

$$\omega = \sqrt{8E_C E_J} \quad (2.52)$$

In Equation (2.52), $E_c$ is a charging energy of the capacitance $C_J$ of each JPO.

$$E_C = \frac{e^2}{2C_J} \quad (2.53)$$

$E_J$ is a Josephson energy of the SQUID of each JPO.

$\omega_-$ is a resonant angular frequency of the coupler 21 (resonant angular frequency corresponding to the boson operator $a_{g-}$) and is given by $$\omega_- \cong \sqrt{8E'_{Cg}E_{Jg}^{(2)}} \quad (2.54)$$

In Equation (2.54), $E'_{cg}$ is a charging energy of a composite capacitance: $C_g$+C and is given by $$E'_{Cg} = \frac{e^2}{2(C_g+C)} \quad (2.55)$$

In Equation (2.54), $E_{Jg}^{(2)}$ is given by Equation (2.19) and the resonant angular frequency of the coupler 21 is given by $$\omega_- \cong \sqrt{8\frac{e^2}{2(C_g+C)}\left(\frac{1}{n}-\alpha\right)E_{JG}} = \sqrt{8\frac{e^2}{2(C_g+C)}\left(\frac{1}{n}-\alpha\right)\left(\frac{\hbar}{2e}\right)I_{cg}} = \sqrt{\frac{2e}{C_g+C}\left(\frac{1}{n}-\alpha\right)\hbar I_{cg}} \quad (2.56)$$

The resonant angular frequency $\omega_-$ of the coupler 21 depends on n and α, while the resonant frequency ω of each JPO does not depend on n and α.

When a value of the resonant angular frequency $\omega_-$ of the coupler 21 is away from the resonant angular frequency ω of each JPO by changing n and α, the coupling coefficient $g^{(4)}$ of the four-body interaction becomes smaller. A value of $\omega_-$ needs to be adjusted by a parameter(s) other than n and α. This can be realized by adjusting a critical current $I_{cg}$ of individual Josephson junctions of the coupler 21.

The following studies a specific circuit parameter setting and shows an effect with n and α adjusted. The following setting is considered.

| | |
|---|---|
| Frequency of JPO ω/2π | 10 GHz(gigaherz) |
| Resonant frequency of coupler 21 $\omega_-/2\pi$ | 9.98 GHz |

-continued

| | |
|---|---|
| Capacitance of each JPO $C_J$ | 1000 fF (femtoFarad) |
| Coupling capacitance of coupler 21 $C_g$ | 200 fF |
| Coupling capacitance between each JPO and coupler 21 C | 1 fF |

The parameters of the Josephson junction are adjusted so that the above frequencies are realized. The effect is evaluated by an absolute value of the coupling coefficient $g^{(4)}$ of the four-body interaction. The reason for this is as follows.

According to Equation (2.51) regarding the coupling coefficient $g^{(4)}$ of the four-body interaction, the value of $g^{(4)}$ may be negative for some combinations of values of n and α. However, a sign of $g^{(4)}$ can be changed by adjusting another parameter(s) not explicitly shown here.

Therefore, the sign of the coupling coefficient $g^{(4)}$ of the four-body interaction is not essential, and it is sufficient to focus only on the absolute value of $g^{(4)}$.

FIG. 7 shows a change in the absolute value of the coupling coefficient $g^{(4)}$ of the four-body interaction under a condition that only a is varied in the above setting for each case of n=1, 3, 5 and 10 where n is the number of the first Josephson junctions 11 connected in series in the coupler 21. In FIG. 7, a vertical axis is an absolute value of $g^{(4)}$ divided by h/2π and converted to MHz (megahertz) unit (h is Planck's constant (about 6.6×10^(−34) joule-second). The other parameters are fixed to the above set values. In particular, the resonant angular frequency on of the coupler 21 is also fixed.

Figure 1:
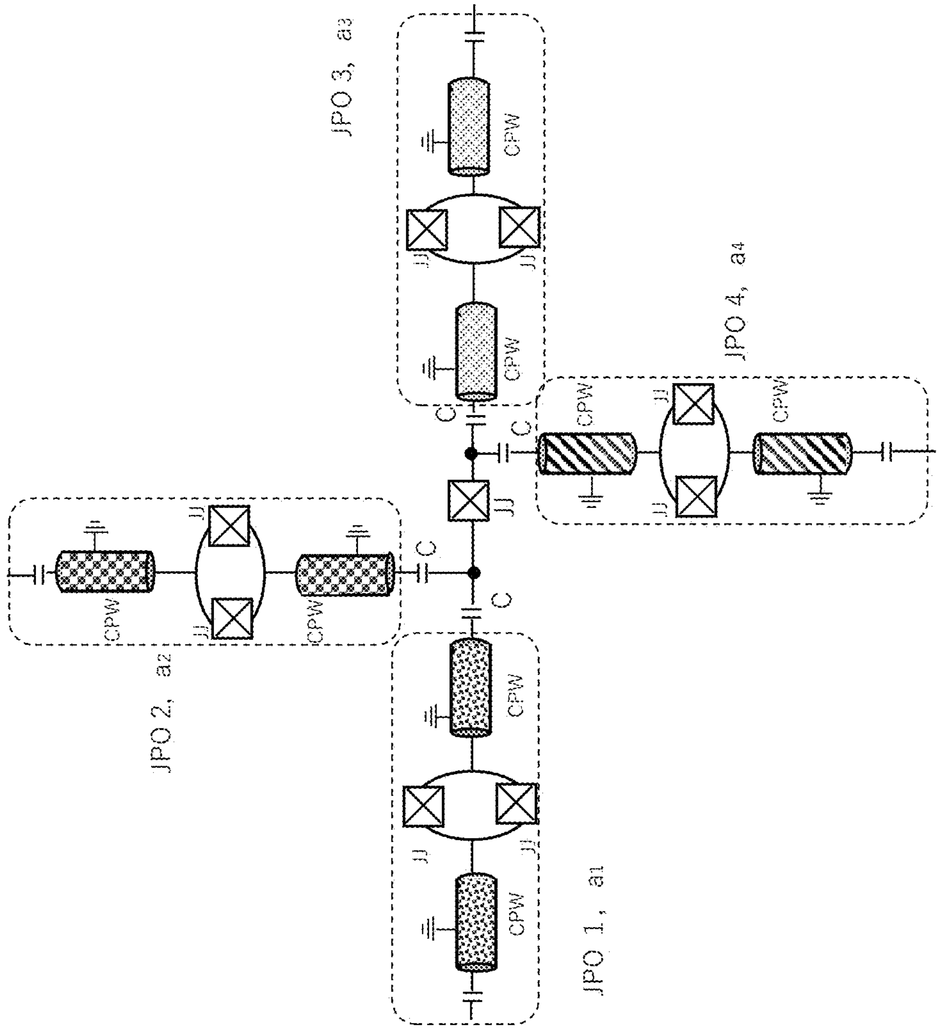
FIG. 1 is a diagram schematically illustrating a related art.
Figure 2:
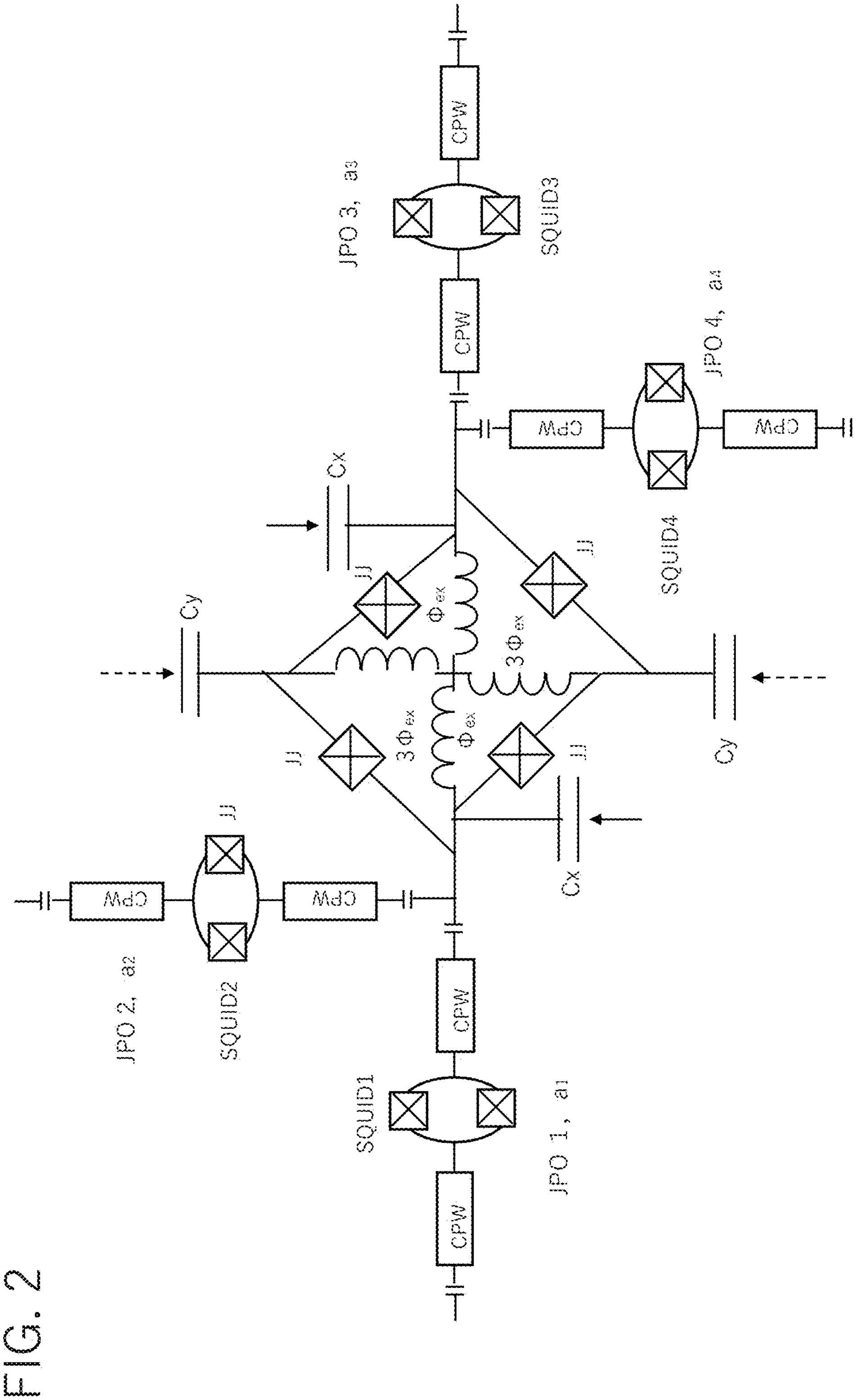
FIG. 2 is a diagram schematically illustrating a related art.

In FIG. 7, the result for n=1 corresponds to the case of the coupler in NPL 1 (FIG. 1 in the present application). In this case, $g^{(4)}$ is constant regardless of α.

According to the coupler 21 of the embodiment, n is set to 2 or more, and in a region where a value of α is large, in particular, $$\alpha \simeq \frac{1}{n}$$

the absolute value of the coupling coefficient $g^{(4)}$ of the four-body interaction rapidly increases and exceeds in case of n=1. That is, the absolute value of the coupling coefficient of the four-body interaction can be made larger than that disclosed in NPL 1.

As described above, in the above embodiment, the four-body interaction of a qubit made up of JPO is realized. In the coupler 21, adjustment is done for n (the number of first Josephson junctions 11 in the coupler 21) and α (a ratio of a Josephson energy of the second Josephson junction 12 to that of the first Josephson junction 1, or a ratio of a junction size of the second Josephson junction 12 to that of the first Josephson junction 1), where n and α are parameters included in the coupling coefficient $g^{(4)}$ of the four-body interaction. In particular, in the range of α=<1/n, a change in the resonant frequency of the coupler 21 caused by the change in a is avoided by adjusting the critical current Ic of the Josephson junction, which can enlarge the absolute value of the coupling coefficient of the four-body interaction.

The coupling coefficient $g^{(4)}$ of the four-body interaction in Equation. (2.51) includes a factor with respect to capacitance $C_J$, $C_g$, and C which belong to circuit parameters, $$\frac{C^4}{C_J^2(C_g + C)^3} \tag{2.57}$$

Therefore, in addition to the circuit parameters n and α in the coupler 21, the coupling coefficient of the four-body interaction $g^{(4)}$ can be enlarged by setting of the capacitance values $C_J$, $C_g$, and C. This is based on the four-body interaction coupling coefficient according to the example embodiment and is a major difference from NPL 2 directed to a two-body interaction.

For example, by reducing the capacitance $C_g$ of the capacitor 15 of the coupler 21 and the capacitance C of the coupling capacitors 31A to 31D, $C_g$+C in a denominator of the coupling coefficient $g^{(4)}$ of the four-body interaction becomes smaller and the value of $g^{(4)}$ becomes larger.

Furthermore, the capacitance $C_g$ of the capacitor 15 of the coupler 21 is made smaller as compared with the capacitance $C_j$ of each JPO.

In order to realize a network for a four-body interaction which is assumed in an LHZ-scheme based quantum annealing, it is needed to weaken a two-body interaction in which only two of the four JPOs interact with each other.

These two-body interactions are proportional to $C/C_J$. In the example embodiment, in order to weaken these two-body interactions, the capacitance C of the coupling capacitors 31A to 31D between each JPO and the coupler 21 is made smaller as compared with the capacitance $C_J$ of each JPO, and thus $C_J/C$ is made large.

In FIGS. 4A and 4B, the configuration of the example embodiment is described as a circuit diagram. In the following, the quantum annealing device will also be described after describing an example of mounting the device on a quantum chip where a superconducting circuit(s) is/are formed in a wiring layer on a substrate.

FIG. 8 schematically illustrates an example of a configuration of the coupler 21 (wiring pattern formed on a substrate) in a case where JPO1 (20A) to JPO4 (20D) in FIG. 4A are configured as a lumped constant type. In FIG. 8, each JPO of JPO1 (20A) to JPO4 (20D) is composed of the configuration of FIG. 4A and configured as a waveguide resonator terminated to ground by each of the SQUIDs 210A to 210D. The waveguide resonator is made to oscillate in a parametric oscillation mode by modulating a magnetic flux penetrating each loop of SQUID 210A to 210D at a frequency approximately twice the resonant frequency with each pump signal (microwave) supplied from each of control lines 23A to 23D.

In JPO1 (20A) to JPO4 (20D), the coupler connection portions 24A to 24D extending from the conductive portions (waveguides including superconducting members) 205A to 205D connecting to the first superconducting parts 203A to 203D of the SQUIDs 210A to 210D are capacitively coupled to the ends of the first and second opposing portions 17A and 17B, the third and fourth opposing portions 19A and 19B.

The coupler connection portions 24A to 24D of JPO1 (20A) to JPO4 (20D) may, for example, include a coplanar waveguide with both sides sandwiched by a ground pattern not shown via gaps along the longitudinal direction. However, as a matter of course not limited to the above configuration.

The coupler 21 for the four-body interaction, includes the first and second opposing portions 17A and 17B extended (elongated) from the first electrode 16 to the two JPOs 1 and 2 (20A, 20B), respectively, and have ends faced to and capacitively coupled to, via coupling capacitors 31A and 311B, ends of the coupler connection portions 24A and 24B of the JPOs 1 and 2 (20A, 20B). The second electrode 18 arranged opposing to the first electrode 16, includes third and fourth opposing portions 19A and 19B faced to and capacitively coupled to, via coupling capacitors 31C and 31D, ends of the coupler connection portions 24C and 24D of the JPOs 3 and 4 (20C and 20D). Provided between the first electrode 16 and the second electrode 18, the loop circuit 10 that includes n first Josephson junctions 11-1 to 11-*n* connected in series and a second Josephson junction 12 connected in parallel to the n first Josephson junctions 11-1 to 11-*n*.

The ends of the first and second opposing portions 17A and 17B extending from the first electrode 16 and the ends of the coupler connection portions 24A and 24B of JPOs 1 and 2 (20A and 20B), respectively opposed to the ends of the first and second opposing portions 17A and 17B are capacitively coupled via capacitors (coupling capacitors (C) 31A and 31B). The ends of the third and fourth opposing portions 19A and 19B and the ends of the coupler connection portions 24C and 24D of JPOs 3 and 4 (20C and 20D) respectively opposed to the ends of the third and fourth opposing portions 19A and 19B are capacitively coupled via capacitors (coupling capacitors (C) 31C and 31D). There is only a gap present between the first and second opposing portions 17A and 17B and the coupler connection portions 24A and 24B respectively opposed to the first and second opposing portions 17A and 17B and only a gap present between the third and fourth opposing portions 19A and 19B and the coupler connection portions 24C and 24D, respectively opposed to the third and fourth opposing portions 19A and 19B.

The first and second electrodes 16 and 18 are capacitively coupled via the capacitor ($C_g$) 15 between the first and second electrodes 16 and 18. There is only a gap present between the first and second electrodes 16 and 18.

In the example of FIG. 8, for simplicity, the first and second opposing portions 17A and 17B and the third and fourth opposing portions 19A and 19B extend from the two side edges of the rectangular shaped first and second electrodes 16 and 18, respectively, but the planar shape of the first and second electrodes 16 and 18 is, as a matter of course, not limited to a rectangle.

In the example embodiment, the coupler 21 and JPO1 (20A) to JPO4 (20D) are realized, for example, by lines (wiring) formed by a superconductor on a substrate. The substrate is silicon (Si), but other electronic materials such as sapphire or compound semiconductor materials (Group IV, III-V, II-VI) may be used. The substrate may preferably be monocrystalline but may also be polycrystalline or amorphous. As the line material (wiring material), Nb (niobium) or Al (aluminum) may be used, for example, but is not limited thereto. Any metal that becomes a superconducting state when cooled to a very low temperature may be used, such as, niobium nitride, indium (In), lead (Pb), tin (Sn), rhenium (Re), palladium (Pd), titanium (Ti), titanium nitride, Mo (molybdenum), tantalum (Ta), tantalum nitrides, and alloys containing at least one of these, etc. In order to minimize thermal noise as much as possible, a coupler circuit is utilized in a temperature environment of about 10 mK (millikelvin), which is realized by a refrigerator.

In FIG. 8, the capacitance value of each capacitor may be set as $$C_J > C_g > C \tag{2.58}$$

In FIG. 8, when an odd number of Josephson junctions among the n first 11-1 to 11-*n* and the second Josephson junction 12 of the loop circuit 10 are π junctions, as described above, a phase difference around the loop circuit 10 is ±π×(odd number). That is, the loop circuit 10 can be biased with a magnetic flux of odd multiples of $\Phi_0/2$ (or $-\Phi_0/2$) (where $\Phi_0$(=h/2e) is the magnetic flux quantum) without applying any external magnetic flux $\Phi_{ext}$. For this reason, the control line 13 and the magnetic field generation part 14, which connect to a current control unit not shown, are not needed.

FIG. 9A illustrates a non-limiting example of the example embodiments described above, and schematically illustrates a non-limiting example of a pattern (planar circuit) of the coupler 21 in FIG. 8. In FIG. 9A, for the sake of drawing convenience, JPO1 to JPO4 are illustrated with their respective coupler connection portions 24A to 24D.

Referring to FIG. 9A, the coupler 21 is arranged surrounded by a ground pattern (ground plane) 40. Though not limited thereto, the coupler connection portions 24A to 24D of JPOs 1 to 4 are surrounded on both sides by the ground pattern (ground plane) 40 via gaps, and the JPOs 1 to 4 themselves are also surrounded by the ground pattern (ground plane) 40. As shown schematically in FIG. 9A, the coupler 21 is spaced apart from an edge of the ground pattern (ground plane) 40 by a gap of about a size of the coupler 21 (on the order of a fraction to several times the size), for example. If the coupler 21 is of the order of 10 to 100 μm (tens to hundreds of μm), a gap spacing may be approximately of this order. In FIG. 9A, 41 is an area where no ground pattern is provided and the substrate is exposed.

In the non-limiting example of FIG. 9A, a planar shape of the first electrode 16 is of an almost trapezoidal shape, rotated about 45 degrees counterclockwise with respect to a horizontal direction of the drawing. The first and second opposing portions 17A and 17B of the first electrode 16 are extended from oblique sides (legs) of the trapezoid to the left and up in the drawing toward the coupler connection portions 24A and 24B of JPO1 and JPO2, respectively. The planar shape of the second electrode 18 is an upside-down trapezoidal shape with the first electrode 16 rotated 180 degrees, and the third and fourth opposing portions 19A and 19B of the second electrode 18 are extended from oblique sides to the right and down in the drawing toward the coupler connection portions 24C and 24D of JPO3 and JPO4, respectively. The first electrode 16 and the second electrode 18 are arranged with their respective trapezoidal bottom sides facing each other, and the planar shape of the bodies together, excluding the facing portions, is close to an almost hexagonal shape.

In a vicinity of the intersection of one end of the bottom of the first electrode 16 and the oblique side, there is provided a protrusion 16C protruding downwardly in the figure, and in a vicinity of the intersection of one end of the bottom of the second electrode 18 and the oblique side, there is a cut portion 18C that is cut off to be parallel to the protrusion 16C of the first electrode 16. Between the protrusion 16C in the vicinity of the intersection of one end of the lower bottom of the first electrode 16 and the oblique edge and the cut portion 18C in the vicinity of the intersection of one end of the lower bottom of the second electrode 18 and the oblique edge, the loop circuit 10 described with reference to (C) of FIG. 5 is arranged (Note that due to the difference in dimensions of the loop circuit 10 and electrodes 16 and 18, the first Josephson junctions 11-1 to 11-*n* and the second Josephson junction 12 are not shown in the figure). In the loop circuit 10, for example, when the second Josephson junction 12 is a r-junction and the remaining n first Josephson junctions 11-1 to 11-*n* are 0-junctions, even without providing a magnetic flux $\Phi_0/2$ penetrating the loop circuit 10, the second Josephson junction 12 potential energy is given by Equation (2.15), and the potential energy V(φ1) of the loop circuit 10 is the same potential energy as in Equation (2.11).

On the other hand, FIG. 9B schematically illustrates a non-limiting example of a pattern (planar circuit) of the coupler 21 in which in the loop circuit 10, the n first Josephson junctions 11-1 to 11-*n* and the second Josephson junction 12 are all zero junctions, and a magnetic flux $\Phi_{ext}=\Phi_0/2$ ($\Phi_0$ is the flux quantum=h/(2e)) penetrating the loop circuit 10 is provided from the magnetic field generation part 14. In FIG. 9B, there is provided an additional control line 13 to which a current is supplied from a current control unit not shown to generate a magnetic flux $\Phi_{ext}$ penetrating the loop circuit 10. The control line 13 is configured as a line with a ground pattern 40 arranged via gaps on both sides in a longitudinal direction. An end portion of the control line 13 functions as the magnetic field generation part 14 in FIG. 8 and is connected to ground (ground pattern 40) in a vicinity of the loop circuit 10. Therefore, adjacent to the loop circuit 10, the ground pattern 40 has a region 30 that protrudes inwardly to become closer to the loop circuit 10. DC current is supplied to the control line 13 from a current control unit not shown so that the magnetic flux $\Phi_{ext}$ generated by the magnetic field generation part 14 (FIG. 8) to penetrate the loop circuit 10 is 1/2 (=h/(4e)) of the flux quantum $\Phi_0$.

In the example illustrated in FIG. 9B, in order to efficiently apply a magnetic flux via an inductive coupling with the control line 13, out of the first and second electrodes 16 and 18, only a part of the electrode close to the loop circuit 10 including the Josephson junctions, a distance between the part of the electrode and the ground pattern 40 is reduced. The control line 13 is formed in the vicinity of the loop circuit 10 and thus the magnetic flux $\Phi_{ext}$ can be applied from an immediate vicinity of the loop circuit 10. As described above, the ground pattern 40 is basically separated from the first and second electrodes 16 and 18, as with FIG. 9A, except for the region 30 that is arranged closer to the loop circuit 10. In FIG. 9B, the control line 13 and the magnetic field generation part 14 of FIG. 8 are arranged on the same wiring layer as the coupler 21, but the configuration is, as a matter of course, not limited to such a configuration. The control line 13 and the magnetic field generation part 14 may be provided at or near a position opposing to the loop circuit 10 of the coupler 21, on a surface of a wiring substrate (interposer) not shown on which a quantum chip including the coupler 21 is flip-chip mounted via bumps.

In the configuration of the coupler 21 in FIGS. 9A and 9B, the capacitance $C_J$ of the capacitors of JPO1 (20A) to JPO4 (20D) (201A to 201D in FIG. 4A), the capacitance Cg of the capacitor of the coupler 21 (15 in FIG. 4A), and the capacitance C of the coupling capacitors (31A to 31D in FIG. 4A) between the coupler connection portions 24A to 24D and the opposing portions 17A, 17B, 19A, and 19B of the coupler 21, may be set as follows.

$$C_J > C_g > C$$

In NPL 2, a coupling device with a superconducting loop circuit with an array of n first Josephson junctions connected in series and a second Josephson junction connected in parallel with the array is disclosed. The following describes comparison of the disclosure of the present application with the disclosure of NPL 2. The following points are common.

The structure of the loop circuit of the coupler 21 is also used as a coupler structure between qubits (or photons) also in NPL 2.

A loop circuit of the Josephson junction has an array of n first Josephson junctions connected in series and one second Josephson junction connected in parallel to the array, the Josephson energy of the second Josephson junction is α times that of the first Josephson junction, and the loop circuit 10 has an external flux $\Phi_{ext}=h/(4e)=\pi\phi_0$. By setting α≈1/n, the interaction coefficient between the qubits can be enlarged.

There are numerous differences between the disclosure of the present application and NPL 2.

For example, a type of interaction generated by the coupler 21 is different. The disclosure of the present application utilizes the coupler 21 to generate the four-body interaction of a qubit (JPO), whereas NPL 2 utilizes this coupler to generate the two-body interaction of a qubit (the four-body interaction coupler is not described at all in NPL 2). As a result, the differences are as follows.

In the embodiment, capacitors are needed to distinguish between JPO1 and JPO2, and between JPO3 and JPO4 whose connection can be done without the coupler targeted to the four-body interaction. In the example embodiments, a coupling capacitor is needed between the qubit (JPO).

The presence or absence of this capacitor also causes the following differences.

In the present disclosure, a resonance occurs in the coupler 21, whereas in NPL 2, a resonance of the coupler itself cannot be conceived. Therefore, the circuit setup and ω– that appears in $g^{(4)}$ do not appear in NPL 2.

The devise of adjusting the value of the resonant angular frequency ω– of the coupler 21 (such that it does not change) in order to enlarge the strength of the four-body interaction (coupling coefficient) is specific to the present application.

Furthermore, in NPL 2, the coupler is directed to the two-body interaction, which is different from four-body interaction. Therefore, X (quarton), etc. in Equation (7) of the coupling coefficients of the interaction in NPL 2 are completely different from the above described coupling coefficient $g^{(4)}$ of the four-body interaction in Equation (2.51) of the present application.

The main difference is that the disclosure of the present application is directed to the four-body interaction of qubits, whereas the NPL 2 is directed to the two-body interaction of qubits. Due to this point, there are differences regarding presence or absence of a capacitor between the qubit and the coupler, presence or absence of resonance of the coupler, presence or absence of the need to adjust the resonant frequency of the coupler, and the expression (equation) of the interaction coefficient.

In order to enlarge the coupling coefficient of the four-body interaction in Equation (2.51), according to the present embodiment, in addition to setting the circuit parameters n and α of the coupler 21, regarding the shunt capacitor $C_J$ of the SQUID of each JPO, the coupling capacitance C between each JPO and coupler 21, and the capacitance $C_g$ of the coupler 21, setting is done such that $C_J>C_g>C$. Thus, the coupling coefficient $g^{(4)}$ of the four-body interaction can be made large.

Furthermore, the resonant angular frequency ω of each JPO and the resonant angular frequency ω_ of the coupler 21 should not be too close. More specifically, with respect to the factor $(\omega\omega_-)^2/(\omega-\omega_-)^4$ in Equation (2.51) of the strength of the four-body interaction, letting $$\omega_-/\omega = 1 \pm \delta \qquad (2.59)$$

δ is, for example, set to satisfy the following condition.

$$\delta > \frac{C}{4\sqrt{C_j(C_g + C)}} \qquad (2.60)$$

FIG. 10 is a schematic diagram of a quantum computer 300 in which JPOs 20 are integrated, as an example configuration of another example embodiment. In the configuration illustrated in FIG. 10, each four-body interaction coupler 21 is connected to four JPO 20s, as illustrated in FIGS. 4A, 4B and 8, respectively. The unit structures illustrated in FIG. 4A, FIG. 4B, FIG. 8, etc. are arranged such that each JPO 20 is connected to one to four couplers 21 for a four-body interaction, and JPO 20 is shared and arranged by multiple unit structures. In the quantum computer 300, at least one JPO 20 is connected to a plurality of couplers 21 for a four-body interaction. In particular, in the example illustrated in FIG. 10, at least one JPO 20 is connected to four couplers 21 for a four-body interaction. The quantum computer 300 may also be described as follows. The quantum computer 300 has a plurality of JPOs 20, each JPO 20 being connected to one to four couplers 21 for a four-body interaction. The number of couplers 21 for a four-body interaction to which each JPO 20 is connected corresponds to how many of the JPOs 20 are shared in the unit structure. Thus, in the example illustrated in FIG. 10, the quantum computer 300 has multiple unit structures and the JPO 20 is shared by multiple unit structures. In the example illustrated in FIG. 10, 13 superconducting nonlinear JPOs 20 are integrated, but any number of JPOs 20 can be integrated in a similar manner. In FIG. 10, a current control part and a readout part are omitted for ease of understanding of the drawing, but JPO 20 is controlled and read out using a current control part and a readout part as described with reference to FIG. 3.

The disclosure of the above embodiments may be annexed as follows (but, as a matter of course, not limited to the following).

(Note 1)

A superconducting quantum circuit includes first through fourth qubits and a coupler that couples the first through fourth qubits by a four-body interaction. The coupler includes a loop circuit connected between one end and an other end of the coupler; a capacitor connected in parallel to the loop circuit.

The loop circuit includes n (n is a positive integer greater than or equal to 2) first Josephson junctions spaced apart from each other and arranged in series, and n (n is a positive integer greater than or equal to 2); a second Josephson junction arranged in parallel with the n first Josephson junctions and having a junction size smaller than that of the first Josephson junction.

The first and second qubits are capacitively coupled to the one end of the coupler, respectively and the third and fourth qubits are capacitively coupled to the other end of the coupler, respectively.

A magnitude of the coupling coefficient of the four-body interaction by the coupler is set based on circuit parameters including at least n and α (0<α<1) which is a ratio of a Josephson energy of the second Josephson junction and that of the first Josephson junction.

(Note 2)

The superconducting quantum circuit according to Note 1, wherein in the coupler, the α may be set to a predetermined value close to 1/n within a range smaller than 1/n which is an inverse of n.

(Note 3)

The loop circuit may be biased with a magnetic flux $\pm\Phi_0/2\times(2k+1)$ (where $\Phi_0$(=h/(2e)) is a magnetic flux quantum: h is a Planck's constant and e is an elementary charge). The superconducting quantum circuit according to Note 1 or 2 may include a magnetic field generation part that flows a DC current fed from a current control part to generate $\Phi_0/2$ or $-\Phi_0/2$ as a magnetic flux that penetrates the loop circuit of the coupler.

(Note 4)

In the superconducting quantum circuit according to Note 1 or 2, an odd number (2k+1, where k is a predetermined non-negative integer) of the n first and second Josephson junctions of the loop circuit may be π junctions and rest may be 0 junctions. With such a configuration, a phase difference when circumventing the loop circuit is $\pm\pi\times(2k+1)$, and the loop circuit is biased with a magnetic flux $\pm\Phi_0/2\times(2k+1)$ (where $\Phi_0$ (=h/(2e)) is a magnetic flux quantum: h is a Planck's constant and e is an elementary charge) without applying a magnetic flux the loop circuit.

(Note 5)

In the superconducting quantum circuit device according to any one of Notes 1 to 4, wherein the loop circuit of the coupler has a first electrode and a second electrode arranged opposite each other spaced apart from a ground pattern in an area surrounded by the ground pattern in a wiring layer on a substrate. The n (n being two or more positive integers) first Josephson junctions and the second Josephson junction, and are arranged in parallel between the first electrode and the second electrode, respectively.

The first electrode may include first and second opposing portions extended towards the first and second qubits from locations of the first electrode other than a side of the first electrode faced to the second electrode, respectively, the first and second opposing portions having ends capacitively coupled to ends of coupler connection portions of the first and second qubits, respectively.

The second electrode may include third and fourth opposing portions extended towards the third and fourth qubits from locations of the second electrode other than a side of the second electrode faced to the first electrode, respectively, the third and fourth opposing portions having ends capacitively coupled to ends of coupler connection portions of the third and fourth qubits, respectively.

(Note 6)

In the superconducting quantum circuit according to Note 5, each of the first and fourth qubits includes a Josephson parametric oscillator, wherein the Josephson parametric oscillator includes

- a superconducting quantum interference device (SQUID) including two Josephson junctions at both ends where a first superconducting line and a second superconducting line that constitute a loop intersect;
- a capacitor connected in parallel to the SQUID; and
- a line that is inductively coupled to the SQUID to generate a magnetic flux that penetrates the loop of the SQUID, wherein one of the first and second superconducting lines of the SQUID is set to a ground potential, and the other of the first and second superconducting lines of the SQUID is connected to the coupler connection portion and the SQUID may be configured to oscillate parametrically according to the microwave current supplied to the line.

(Note 7)

In the superconducting quantum circuit according to Note 6, the circuit parameter defining the coupling coefficient of the four-body interaction includes, in addition to the α and the n, C, a value of capacitance of the capacitive coupling between the coupler connection portion of each of the first to fourth qubits and each of the first to fourth opposing portions of the coupler;

$C_J$, a value of capacitance of the capacitor connected in parallel to the SQUID of each of the first and fourth qubits; and, $C_g$, a value of capacitance between the first and second electrodes of the coupler, with a magnitude relationship thereamong set to $$C_J > C_g > C.$$

(Note 8)

In the superconducting quantum circuit according to Note 6 or 7, with respect to circuit parameters including the α and the n;

C, a value of the capacitance of the capacitive coupling between the coupler connection portion of each of the first and fourth qubits and each of the first and fourth opposing portions of the coupler;

$C_J$, a value of the capacitance of the capacitors connected in parallel to the SQUID of each of the first and fourth qubits;

$C_g$, a value of the capacitance between the first and second electrodes of the coupler, and a difference between a resonant angular frequency ω_ of the coupler and a resonant angular frequency ω of each qubit, the coupling coefficient of the four-body interaction may be configured to be expressed as follows.

$$\frac{(\omega\omega_-)^2}{(\omega-\omega_-)^4}\cdot\frac{C^4}{C_J^2(C_g+C)^3}\cdot\left\{\frac{1-n^3\alpha}{n^2(1-n\alpha)}\right\}$$

(Note 9)

A superconducting quantum circuit apparatus, wherein the superconducting quantum circuit according to any one of Notes 1 to 8, constitute a quantum computer that includes, as a unit structure, the first to fourth qubits that perform Josephson parametric oscillation; and the coupler.

(Note 10)

The superconducting quantum circuit apparatus as according to Note 9, wherein a plurality of the unit structures are provided, and the unit structure may constitute a quantum computer in which at least one of the first through fourth qubits are shared by one or more other the unit structures.

Each disclosure of PTLs 1 and 2 and NPLs 1 to 5 cited above is incorporated herein in its entirety by reference thereto. It is to be noted that it is possible to modify or adjust the example embodiments or examples within the whole disclosure (including the Claims) and based on the basic technical concepts thereof. Further, it is possible to variously combine or select a wide variety of the disclosed elements (including the individual elements of the individual claims, the individual elements of the individual examples and the individual elements of the individual figures) within the scope of the Claims of the present application. That is, it is self-explanatory that the present disclosure includes any types of variations and modifications to be done by a skilled person according to the whole disclosure including the Claims, and the technical concept thereof.

What is claimed is:

1. A superconducting quantum circuit comprising:

first to fourth qubits; and a coupler that couples the first to fourth qubits by a four-body interaction, wherein the coupler includes:

a loop circuit connected between one end and an other end of the coupler; and a capacitor connected in parallel to the loop circuit, wherein the loop circuit includes:

n (n is a positive integer greater than or equal to 2) first Josephson junctions spaced apart from each other and arranged in series; and a second Josephson junction arranged in parallel with the n first Josephson junctions, the second Josephson junction having a junction size smaller than that of the first Josephson junction, wherein the first and second qubits are capacitively coupled to the one end of the coupler, respectively, and the third and fourth qubits are capacitively coupled to the other end of the coupler, respectively, and wherein a magnitude of a coupling coefficient of the four-body interaction by the coupler is made configurable based on circuit parameters including at least the n and α ($0<\alpha<1$) that is a ratio of a Josephson energy of the second Josephson junction and that of the first Josephson junction.

2. The superconducting quantum circuit according to claim 1, wherein in the coupler, the α is set to a predetermined value close to 1/n within a range smaller than 1/n an inverse of the n.

3. The superconducting quantum circuit according to claim 1, comprising a magnetic field generation part, wherein the magnetic field generation part, when a DC current from a current control part is passed therethrough, generates a magnetic flux $\Phi_0/2$ or $-\Phi_0/2$ (where $\Phi_0$ (=h/(2e)) is a magnetic flux quantum: h is a Planck's constant and e is an elementary charge), the magnetic flux penetrating the loop circuit of the coupler.

4. The superconducting quantum circuit according to claim 1, wherein, out of the n first Josephson junctions and the second Josephson junction of the loop circuit, odd number (2k+1, where k is a predetermined non-negative integer) junctions are set to π-junctions and rest are set to zero-junctions, and a phase difference when going around the loop circuit is $\pm\pi\times(2k+1)$, the loop circuit being in a state biased with a magnetic flux $\pm\Phi_0/2\times(2k+1)$ (where $\Phi_0$(=h/(2e)) is a magnetic flux quantum: h is a Planck's constant and e is an elementary charge) without applying any magnetic flux that penetrates the loop circuit.

5. The superconducting quantum circuit according to claim 1, wherein the loop circuit of the coupler includes a first electrode and a second electrode arranged opposite to each other, and spaced apart from a ground pattern in a region surrounded by the ground pattern in a wiring layer on a substrate, wherein the n (n being two or more positive integers) first Josephson junctions and the second Josephson junction are arranged in parallel between the first electrode and the second electrode, respectively, wherein the first electrode includes first and second opposing portions extended towards the first and second qubits from locations of the first electrode different from a side where the first electrode is opposed to the second electrode, respectively, the first and second opposing portions having ends capacitively coupled to ends of coupler connection portions of the first and second qubits, respectively, and wherein the second electrode includes third and fourth opposing portions extended towards the third and fourth qubits from locations of the second electrode different from a side where the second electrode is opposed to the first electrode, respectively, the third and fourth opposing portions having ends capacitively coupled to ends of coupler connection portions of the third and fourth qubits, respectively.

6. The superconducting quantum circuit according to claim 5, where each of the first to fourth qubits includes a Josephson parametric oscillator, wherein the Josephson parametric oscillator includes:

a superconducting quantum interference device (SQUID) including two Josephson junctions at both ends where a first superconducting line and a second superconducting line that constitute a loop intersect;

a capacitor connected in parallel to the SQUID; and a line configured to inductively couple to the SQUID to generate a magnetic flux that penetrates the loop of the SQUID, wherein one of the first and second superconducting lines of the SQUID is set to a ground potential, and an other of the first and second superconducting lines of the SQUID is connected to the coupler connection portion, and wherein the Josephson parametric oscillator is configured to perform parametric oscillation according to a microwave current supplied to the line.

7. The superconducting quantum circuit according to claim 6, wherein circuit parameter defining the coupling coefficient of the four-body interaction includes, in addition to the α and the n, C which is a value of capacitance of a capacitive coupling between the coupler connection portion of each of the first to fourth qubits and each of the first to fourth opposing portions of the coupler;

$C_J$ which is a value of capacitance of the capacitor connected in parallel to the SQUID of each of the first and fourth qubits; and, $C_g$ which is a value of capacitance between the first and second electrodes of the coupler, with a magnitude relationship thereamong set to $C_J>C_g>C$.

8. The superconducting quantum circuit according to claim 6, wherein with respect to circuit parameters including:

the α and the n;

C which is a value of the capacitance of the capacitive coupling between the coupler connection portion of each of the first and fourth qubits and each of the first and fourth opposing portions of the coupler;

$C_J$ which is a value of the capacitance of the capacitors connected in parallel to the SQUID of each of the first and fourth qubits;

$C_g$ which is a value of the capacitance between the first and second electrodes of the coupler; and a difference between a resonant angular frequency $\omega_-$ of the coupler and a resonant angular frequency ω of each of the first to fourth qubits, the coupling coefficient of the four-body interaction is given by $$\frac{(\omega\omega_-)^2}{(\omega-\omega_-)^4}\cdot\frac{C^4}{C_J^2(C_g+C)^3}\cdot\left\{\frac{1-n^3\alpha}{n^2(1-n\alpha)}\right\}.$$

9. The superconducting quantum circuit according to claim 6, wherein a capacitance C of a coupling capacitor between each of the first to fourth qubits and the coupler is set smaller as compared with a capacitance $C_J$ of each of the capacitors of the first to fourth qubit to weaken a two-body interaction in which two of the first to fourth qubits interact with each other.

10. The superconducting quantum circuit according to claim 1, wherein the α (0<α<1) is a ratio of the junction size of the second Josephson junction to that of the first Josephson junction.

11. A superconducting quantum circuit apparatus including a superconducting quantum circuit, wherein the superconducting quantum circuit comprises:

first to fourth qubits; and a coupler that couples the first to fourth qubits by a four-body interaction, wherein the coupler includes:

a loop circuit connected between one end and an other end of the coupler; and a capacitor connected in parallel to the loop circuit, wherein the loop circuit includes:

n (n is a positive integer greater than or equal to 2) first Josephson junctions spaced apart from each other and arranged in series; and a second Josephson junction arranged in parallel with the n first Josephson junctions, the second Josephson junction having a junction size smaller than that of the first Josephson junction, wherein the first and second qubits are capacitively coupled to the one end of the coupler, respectively, and the third and fourth qubits are capacitively coupled to the other end of the coupler, respectively, and wherein a magnitude of a coupling coefficient of the four-body interaction by the coupler is made configurable based on circuit parameters including at least the n and α (0<α<1) that is a ratio of the Josephson energy of the second Josephson junction and that of the first Josephson junction, wherein the superconducting quantum circuit constitutes a quantum computer including, as a unit structure, the first to fourth qubits that are each configured to perform Josephson parametric oscillation and the coupler.

12. The superconducting quantum circuit apparatus as according to claim 11, including a plurality of the unit structures, wherein the unit structure constitutes a quantum computer in which at least one of the first through fourth qubits are shared by one or more other the unit structures.

* * * * *